(12) United States Patent
Frenne et al.

(10) Patent No.: US 10,517,081 B2
(45) Date of Patent: Dec. 24, 2019

(54) INITIALIZING REFERENCE SIGNAL GENERATION IN WIRELESS NETWORKS

(75) Inventors: Mattias Frenne, Uppsala (SE);
Jung-Fu Cheng, Fremont, CA (US);
George Jöngren, Sundbyberg (SE);
Havish Koorapaty, Saratoga, CA (US);
Daniel Larsson, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1025 days.

(21) Appl. No.: 13/882,632

(22) PCT Filed: May 11, 2012

(86) PCT No.: PCT/SE2012/050502
§ 371 (c)(1),
(2), (4) Date: May 7, 2014

(87) PCT Pub. No.: WO2013/085451
PCT Pub. Date: Jun. 13, 2013

(65) Prior Publication Data
US 2014/0247775 A1 Sep. 4, 2014

Related U.S. Application Data

(60) Provisional application No. 61/568,933, filed on Dec. 9, 2011.

(51) Int. Cl.
*H04W 72/04* (2009.01)
*H04L 5/00* (2006.01)
*H04L 25/02* (2006.01)

(52) U.S. Cl.
CPC ......... *H04W 72/042* (2013.01); *H04L 5/0048* (2013.01); *H04L 25/0226* (2013.01)

(58) Field of Classification Search
CPC .................. H04L 25/0226; H04W 72/042
See application file for complete search history.

(56) References Cited

U.S. PATENT DOCUMENTS

2008/0089431 A1* 4/2008 Van De Beek ...... H04B 7/2615
375/260
2009/0268910 A1 10/2009 Liu et al.
(Continued)

OTHER PUBLICATIONS

Alexei Davydov et al. (U.S. Appl. No. 61/439,987) "Advanced Wireless Communication Systems and Techniques".*
(Continued)

*Primary Examiner* — Mansour Oveissi
(74) *Attorney, Agent, or Firm* — Sage Patent Group

(57) ABSTRACT

A transmitting node uses different reference signal sequences for different types of enhanced control channels. An example method begins with generating (1410) a first reference signal sequence, from a first initialization value, and generating (1420) a second reference signal sequence, from a second initialization value. These reference signal sequences are associated with two corresponding enhanced control transmissions. A first enhanced control channel and reference symbols taken from the first reference signal sequence are transmitted (1430), using first time-frequency resources and a first set of transmission points or a first set of antenna ports or both, and a second enhanced control channel and reference symbols taken from the second reference signal sequence are also transmitted (1440), using a differing second set of transmission points and/or a differing second set of antenna ports and/or a differing second set of time-frequency resources, in the same subframe or group of subframes.

51 Claims, 15 Drawing Sheets

(56) References Cited

U.S. PATENT DOCUMENTS

| | | | |
|---|---|---|---|
| 2010/0323709 A1 | 12/2010 | Nam et al. | |
| 2011/0280333 A1* | 11/2011 | Yang | H04L 5/003 375/295 |
| 2012/0176885 A1* | 7/2012 | Lee | H04J 13/0048 370/209 |
| 2013/0003663 A1* | 1/2013 | Blankenship | H04L 5/0053 370/329 |
| 2013/0058285 A1* | 3/2013 | Koivisto | H04L 1/0046 370/329 |
| 2013/0114536 A1* | 5/2013 | Yoon | H04L 5/0051 370/329 |

OTHER PUBLICATIONS

Author Unknown, "Multiplexing of UE-specific RS and cell-specific RS in DL," CATT; 3GPP TSG RAN WG1 meeting #52; R1-080796; Feb. 11-15, 2008. pp. 1-4. Sorrento, Italy.

3rd Generation Partnership Project. "Discussion on ePDCCH Design Issues." 3GPP TSG·RAN1#66 meeting, R1-112517, Aug. 22-26, 2011, pp. 1-4, Athens, Greece.

3rd Generation Partnership Project. "Design Consideration for E-PDCCH" 3GPP TSG RAN WG1 Meeting #66 bis, R1-113236, Oct. 10-14, 2011, pp. 1-6, Zhuhai, China.

3rd Generation Partnership Project. "Reference signals for E-PDCCH." 3GPP TSG-RAN WG1 Meeting #67, R1-113899, Nov. 14-18, 2011, pp. 1-3, San Francisco, USA.

3rd Generation Partnership Project. "Consideration on Reference Signal for E-PDCCH." 3GPP TSG RAN WG1 Meeting #67, R1-113932, Nov. 14-18, 2011, pp. 1-5, San Francisco, USA.

3rd Generation Partnership Project. "Research in Motion, UK Limited." 3GPP TSG RAN WG1 Meeting #67, R1-113958, Nov. 14-18, 2011, pp. 1-4, San Francisco, USA.

3rd Generation Partnership Project. "DM-RS based Distributed and Localized E-PDCCH structure." 3GPP TSG RAN WG1 #67, R1-114239, Nov. 14-18, 2011, pp. 1-4, San Francisco, USA.

3rd Generation Partnership Project. 3GPP TS 36.211 V10.3.0 (Sep. 2011). 3rd Generation Partnership Project; Technical Specification Group Radio Access Network; Evolved Universal Terrestrial Radio Access (E-UTRA); Physical Channels and Modulation (Release 10). Sep. 2011, pp. 1-103.

Unknown, Author, "Search space for enhanced control channels", 3GPP TSG-RAN WG1 #67, R1-113680, Ericsson, San Francisco, CA, Nov. 14-18, 2011, 1-3.

Unknown, Author, "Consideration for DMRS enhancement in CoMP", ZTE, 3GPP TSG RAN WG1 Meeting #67, R1-113765, San Francisco, Nov. 14-18, 2011, 1-6.

Unknown, Author, "Considerations on UE-specific DM-RS configuration", CATT, 3GPP TSG RAN WG1 Meeting #67, R1-113732, San Francisco, Nov. 14-18, 2011, 1-3.

Unknown, Author, "DL DM-RS Sequence for Rel-11 CoMP", NTT docomo, 3GPP TSG RAN WG1 Meeting #67, R1-114074, San Francisco, Nov. 14-18, 2011, 1-7.

* cited by examiner

INITIALIZING REFERENCE SIGNAL GENERATION IN WIRELESS NETWORKS

TECHNICAL FIELD

The present invention relates generally to the operation of wireless devices in wireless communication networks, and more particularly relates to techniques for allocating and applying reference signals in these networks.

BACKGROUND

3GPP Long Term Evolution (LTE) technology is a mobile broadband wireless communication technology in which transmissions from base stations (referred to as eNodeB's or eNBs by 3GPP) to mobile stations (referred to as user equipment, or UEs, by 3GPP) are sent using orthogonal frequency-division multiplexing (OFDM). The signal transmitted by the eNB in a downlink (the radio link carrying transmissions from the eNB to the UE) subframe may be transmitted from multiple antennas and the signal may be received at a UE that has multiple antennas. The radio channel distorts the transmitted signals from the multiple antenna ports. Accordingly, to demodulate any transmissions on the downlink, a UE relies on reference symbols (RS) that are transmitted on the downlink. These reference symbols and their position in the time-frequency resource grid are known to the UE and hence can be used to determine channel estimates by measuring the effect of the radio channel on these symbols.

Multi-antenna techniques used in LTE include the use of "transmit precoding" to direct the transmitted energy towards one particular receiving UE. With this technique, several antenna elements are used to transmit the same message, but individual phase and possibly amplitude weights are applied at each transmit antenna element. This is sometimes denoted UE-specific precoding and the RS in this case are denoted UE-specific RS. If the transmitted data is precoded with the same UE-specific precoding as the UE-specific RS, then the transmission is performed using a single virtual antenna, i.e., a single antenna port, and the UE need only to perform channel estimation using this single UE-specific RS and use it as a reference for demodulating the data in the corresponding resource block (RB).

UE-specific RS in a given RB pair are transmitted only when data is transmitted to a UE in the RB pair; otherwise they are not present. In LTE, UE-specific RS are included as part of each RB that is allocated to a UE for demodulation of physical downlink shared data channel (PDSCH). Up to 8-layer PDSCH transmission is supported, and therefore there are 8 orthogonal UE-specific RS, as described in 3GPP TS 36.211 (available at www.3gpp.org). These 8 different UE-specific RS correspond to antenna ports 7-15 in the 3GPP specifications.

Release 11 of the 3GPP standards for LTE include specifications directed to so-called coordinated multi-point transmission (CoMP). To support CoMP, it has been decided that a UE can be semi-statically configured with a reference signal sequence for the UE-specific RS (antenna ports 7-15) in a UE-specific manner, where the initialization values for the scrambling generator are available for dynamic selection. In this case the dynamic selection of the reference signal sequence is signaled in the downlink control information transmitted in the downlink control channel. This is useful in a shared cell scenario, where the same cell ID, $N_{ID}^{cell}$, is used by a group of geographically distributed nodes, which group often includes a macro node and all picos that are essentially within the coverage area of the macro. Depending on the channel properties, there is more or less interference between the UE-specific RS used in the two pico nodes. Therefore, it is useful to configure the reference signal in a UE-specific manner instead of a cell-specific manner.

In the Release 10 specifications for LTE, a relay control channel was defined. This relay control channel, denoted R-PDCCH, is for transmitting control information from an eNB to one or more relay nodes. The R-PDCCH is placed in the data region and is thus similar to a PDSCH transmission. The transmission of the R-PDCCH can be configured to use either a common reference signal (CRS) to provide wide cell coverage or relay node (RN)-specific reference signals to improve the link performance towards a particular RN by precoding, in a manner that is similar to how the PDSCH is transmitted with UE-specific RS. In the latter case, the UE-specific RS is used for the R-PDCCH transmission. The R-PDCCH occupies a specific number of configured RB pairs in the system bandwidth and is thus frequency multiplexed with the PDSCH transmissions filling in the remaining RB pairs.

In LTE Release 11 discussions, attention has turned towards adopting these same techniques to support enhanced control channels, including enhanced versions of PDCCH, PHICH, PCFICH, PBCH. Thus, the same principle of UE-specific transmission as discussed above for the PDSCH and the R-PDCCH is applied to the enhanced control channel, thus allowing the transmission of generic control messages to a UE based on UE-specific reference signals. These enhanced control channels are commonly known as the enhanced PDCCH (ePDCCH), enhanced PHICH (ePHICH), and so on.

More particularly, it has been agreed to use antenna ports $p \in \{7, 8, 9, 10\}$ for demodulation of the enhanced control channels. These are the same antenna ports that are used for PDSCH transmissions based on UE-specific RS. This enhancement means that precoding gains can be achieved also for the control channels. Another benefit is that different RB pairs (or enhanced control regions) can be allocated to different cells or different transmission points within a cell, and thereby inter-cell or inter-point interference coordination between control channels can be achieved.

Alternatively, the same enhanced control region can be used in different transmission points within a cell or in transmissions from transmission points in different cells, but which are not highly interfering with each other. A typical case is the shared cell scenario, where a macro cell contains lower power pico nodes within its coverage area, the pico nodes having (or being associated to) the same synchronization signal/cell ID as the macro node. In pico nodes that are geographically separated, the same enhanced control region, i.e., the same physical resource blocks (PRBs) used for the ePDCCH, can be re-used. In this manner the total control channel capacity in the shared cell will increase, since a given PRB resource is re-used, potentially multiple times, in different parts of the cell.

The specifications for enhanced control channels developed by 3GPP contemplate a wide variety of scenarios in which the enhanced control channels will be used. As a result, improved techniques are needed for assigning reference signal sequences to achieve robust channel estimation in these various enhanced control channel scenarios.

SUMMARY

Present approaches to assigning and applying reference signals are not adequate to fully support the transmission of enhanced control channels in several scenarios. One problem is how to assign reference signal sequences to achieve robust channel estimation for demodulating the enhanced control channels in shared cell scenarios where cell or area splitting is used for the enhanced control channels. Another problem is how to assign reference signal sequences to achieve robust channel estimation for demodulating enhanced control channels belonging to the common search space. Still another problem is how to assign reference signal sequences for demodulating enhanced control channels that are used for initial access to a carrier, for example to receive system information. Further, how to assign reference signal sequences for demodulating enhanced control channels that are used for initial access to a stand-alone carrier type is a problem. Finally, it is also a problem how to minimize signaling overhead for configuring the reference signal sequences.

In several embodiments of the present invention, the reference signal sequence used for the RS associated with an enhanced control channel (eCCH) transmission is not a fixed and given sequence for a given cell, but is one of a set of different reference signal sequences. Which sequence to use for a particular eCCH is determined by the transmitting node and/or the UE based on one or several factors such as whether the eCCH belongs to a UE-specific or a common search space, whether the eCCH belongs to a localized or distributed transmission of eCCHs, whether the eCCH is of a broadcast or a unicast type, whether the eCCH is a random access response, a paging message, etc., and/or whether the eCCH belongs to a message read at initial access to the carrier, such as the system information.

As a result, a transmitting node according to several embodiments of the present invention will use different reference signal sequences for different types of enhanced control channels, even if those different types of enhanced control channels are transmitted at the same time. Because those different types of enhanced control channels may be targeted to different UEs or groups of UEs, or may be making different uses of frequency diversity, etc., the associated reference signal sequences may be transmitted from different sets of transmission points controlled by the transmitting node, or using different sets of antenna ports, or using different sets of time-frequency resources (such as PRB pairs) or any combination of these.

An example method according to the techniques described in detail below, suitable for implementation by a wireless base station, begins with the generating of a first reference signal sequence from a first initialization value. A second reference signal sequence is also generated, from a second initialization value. These two reference signal sequences are associated with two corresponding enhanced control transmissions. Accordingly, a first enhanced control channel and reference symbols taken from the first reference signal sequence are transmitted, using a first set of time-frequency resources and using a first set of transmission points or a first set of antenna ports, or both, and a second enhanced control channel and reference symbols taken from the second reference signal sequence are also transmitted, using a second set of transmission points, differing from the first set, or using a second set of antenna ports, differing from the second set, or a second set of time-frequency resources, differing from the second set, or some combination of these differing second sets. The second enhanced control channel and its associated reference symbols are transmitted in the same subframe or group of subframes in which the first enhanced control channels and reference symbols from the first reference signal sequence are transmitted.

As will be discussed in further detail below, the first and second enhanced control channels referred to above, having associated reference symbols taken from different reference signal sequences, are of different types. For example, in some cases the first enhanced control channel is targeted to a common search space and the second enhanced control channel is targeted to a UE-specific search space. One or the other of the enhanced control channels may be a random access response, for example, or a paging message, or a broadcast control message. In some instances, the first enhanced control channel is distributed among two or more frequency-diverse enhanced control channel regions in the downlink subframe or subframes, while the second enhanced control channel is transmitted from a single, frequency-localized enhanced control channel region.

In some embodiments, the first reference signal sequence is the same used for transmitting a channel-state-information reference signal. In some of these or in other cases, the second initialization value is the same as or is derived from an initialization value used to obtain demodulation reference signals for a traffic channel transmission. In other embodiments, one of the initialization values is derived from information contained in a synchronization sequence transmitted by the wireless base station.

Corresponding methods suitable for implementation by a mobile station are also described in detail below. One example method for demodulating an enhanced control channel begins with selecting from a first reference signal sequence generated from a first initialization value and a second reference signal sequence generated from a second initialization value, followed by the performing of channel estimation for a received signal, using reference symbols taken from the selected reference signal sequence. The method continues with the demodulation of an enhanced control channel using the channel estimation results.

In some embodiments, the first reference signal sequence is selected, in response to a determination that the enhanced control channel is targeted to a common search space. In some of these embodiments, the enhanced control channel is a random access response, or a paging message, or a broadcast control message. In other instances, the second signal sequence is selected instead, in response to a determination that the enhanced control channel is targeted to a UE-specific search space.

In other embodiments, the first reference signal sequence is selected in response to a determination that the enhanced control channel is a frequency-distributed transmission, while in other instances the second reference signal sequence is selected in response to a determination that the enhanced control channel is a frequency-localized transmission.

In any of the mobile-station-based embodiments summarized above, the first initialization value or the second initialization value, or both, may be determined based on information obtained by Radio Resource Control (RRC) signalling. In others, one or both is derived from a slot number, or a cyclic-prefix length, or both. In various other embodiments, the first initialization value or the second initialization value, or both, are based on the reference signal sequence used for channel-state-information reference signal transmission, or are based on the reference signal sequence used for a traffic channel transmission, or are based on information obtained from a synchronization signal included in the received signal.

In several embodiments, a mobile station or other wireless device receives configuration data identifying a set of initialization values, and obtains an index value from the demodulated enhanced control channel, the index value corresponding to a first value from the set of initialization values. The device then performs channel estimation for a traffic channel transmission using reference symbols taken from a reference signal sequence generated from the first value, and demodulates the traffic channel transmission using the results of said channel estimation.

Base station and mobile station apparatus adapted to carry out any of the techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

DETAILED DESCRIPTION

Figure 1:
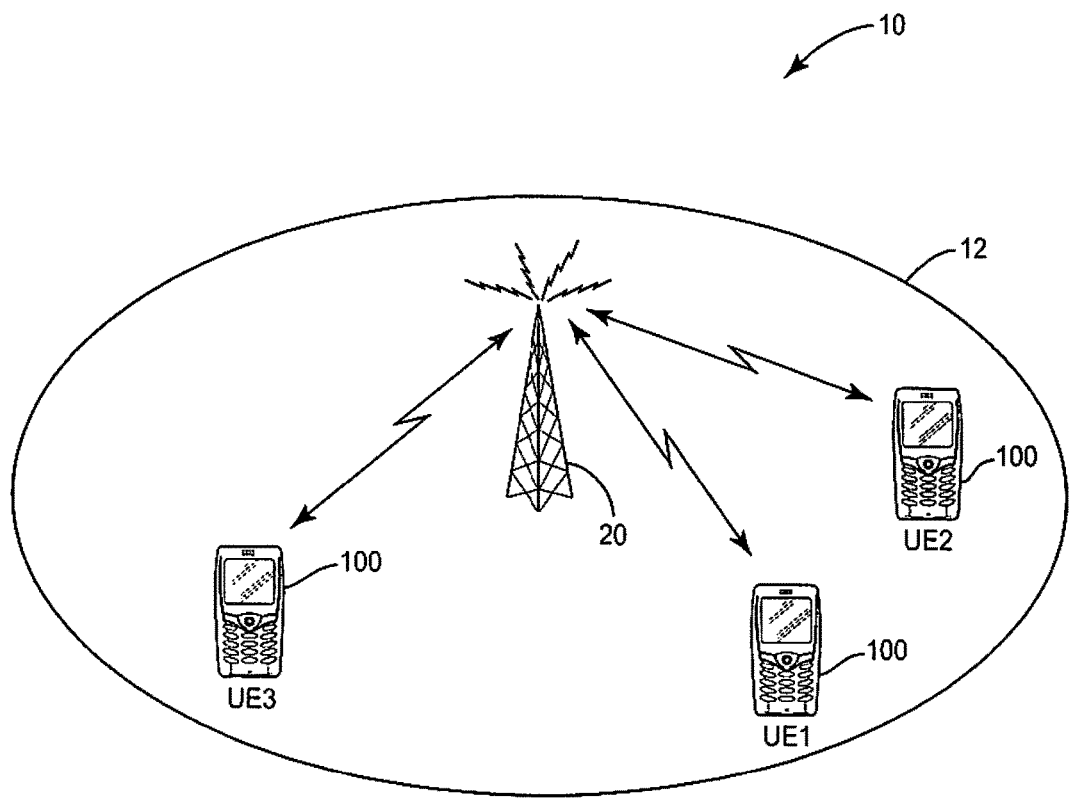
FIG. 1 illustrates a portion of an example mobile communication system.

Referring now to the drawings, FIG. 1 illustrates an exemplary mobile communication network 10 for providing wireless communication services to mobile stations 100. Three mobile stations 100, which are referred to as "user equipment" or "UE" in LTE terminology, are shown in FIG. 1. The mobile stations 100 may comprise, for example, cellular telephones, personal digital assistants, smart phones, laptop computers, handheld computers, or other devices with wireless communication capabilities, including so-called machine-to-machine (M2M) devices with communication capability of machine-type character, i.e., without necessarily requiring any user interaction, such as sensors, measurement devices, etc. The mobile communication network 10 comprises a plurality of geographic cell areas or sectors 12. Each geographic cell area or sector 12 is served by a radio base station 20, which is referred to in LTE as a NodeB or Evolved NodeB (eNodeB). One base station 20 may provide service in multiple geographic cell areas or sectors 12. The mobile stations 100 receive signals from base station 20 on one or more downlink (DL) channels, and transmit signals to the base station 20 on one or more uplink (UL) channels.

For illustrative purposes, several embodiments of the present invention will be described in the context of a Long-Term Evolution (LTE) system. Those skilled in the art will appreciate, however, that several embodiments of the present invention may be more generally applicable to other wireless communication systems, including, for example, WiMax (IEEE 802.16) systems. Likewise, it should be appreciated that while several of the signals described herein are characterized with respect to an OFDM system, the signals mentioned in this disclosure can represent signals in other domains than in the time-frequency grid of an OFDM system.

Finally, it should be noted that the term "antenna port," as used herein, does not necessarily correspond to specific physical antennas. Instead, an antenna port is a more general concept that allows for multi-antenna precoding or beam-forming of transmitted signals, for example, in such a manner that the receiving mobile station need not necessarily be aware of how many physical antennas are used or how the transmitted signals were mapped to those physical antennas. Accordingly, the term "antenna port" should be understood according to the sense given to it by LTE specifications, i.e., that if two received signals can be assumed to have experienced the same overall channel, including any joint processing at the transmitter side, then they have been transmitted on the same antenna port. On the downlink, then, an antenna port can be seen as corresponding to the transmission of a reference signal, such that the demodulation of a data transmission from a given antenna port can rely on the corresponding reference signal for channel estimation for coherent demodulation purposes.

Figure 2:
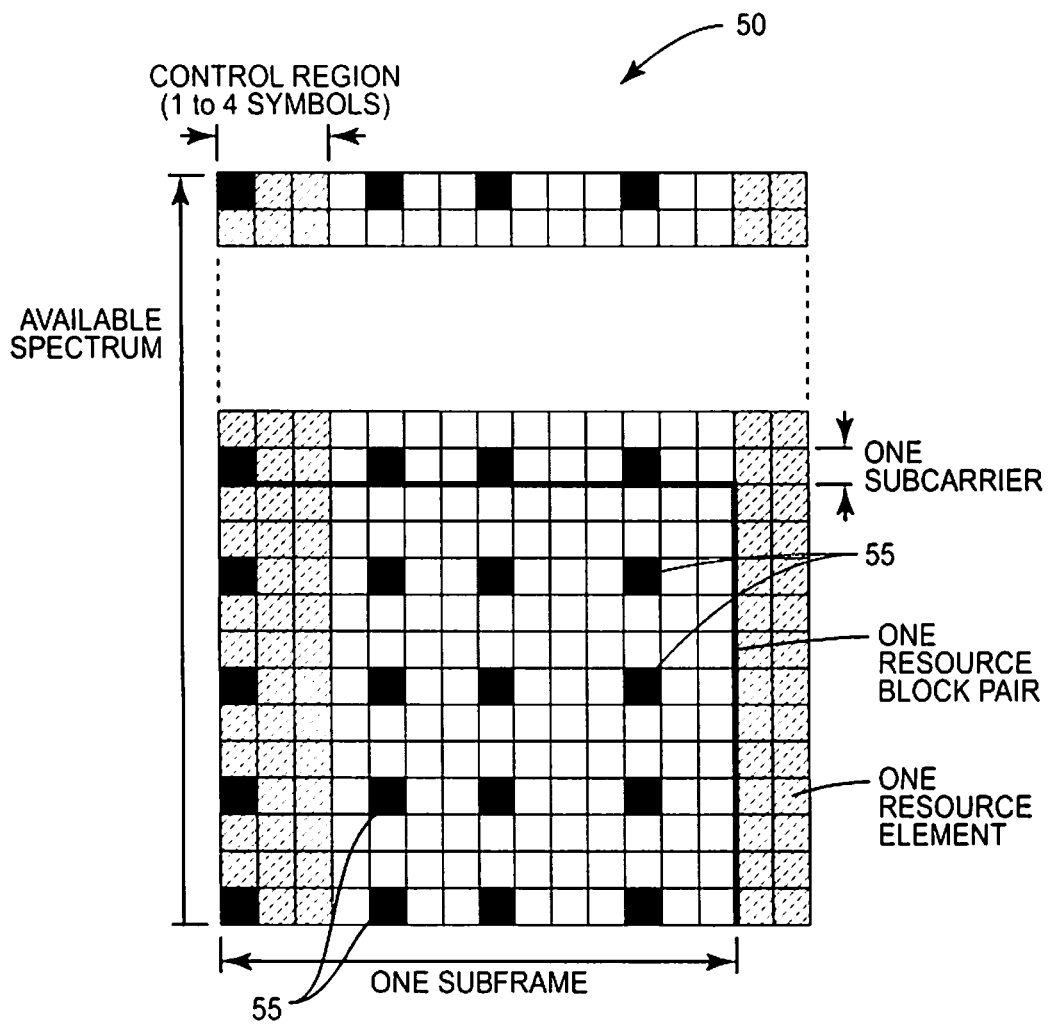
FIG. 2 illustrates a grid of time-frequency resources for a mobile communication system that uses OFDM.

LTE uses Orthogonal Frequency Division Multiplexing (OFDM) in the downlink and Discrete Fourier Transform (DFT)-spread OFDM in the uplink. The basic LTE downlink physical resource can be viewed as a time-frequency grid. FIG. 2 illustrates a portion of the available spectrum of an exemplary OFDM time-frequency grid 50 for LTE. Generally speaking, the time-frequency grid 50 is divided into one millisecond subframes. Each subframe includes a number of OFDM symbols. For a normal cyclic prefix (CP) length, suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 50 is a resource element. A resource element consists of one OFDM subcarrier during one OFDM symbol interval. Resource elements are grouped into resource blocks (RBs), where each RB in turn consists of twelve OFDM subcarriers, within one of two equal-length slots of a subframe. FIG. 2 illustrates a resource block pair, comprising a total of 168 resource elements.

Downlink transmissions are dynamically scheduled, in that in each subframe the base station transmits control information identifying the mobile terminals to which data is transmitted and the resource blocks in which that data is transmitted, for the current downlink subframe. This control signaling is typically transmitted in a control region, which occupies the first one, two, three, or four OFDM symbols in each subframe. A downlink system with a control region of three OFDM symbols is illustrated in FIG. 2. The dynamic scheduling information is communicated to the UEs ("user equipment," 3GPP terminology for a mobile station) via a Physical Downlink Control Channel (PDCCH) transmitted in the control region. After successful decoding of a PDCCH, the UE performs reception of traffic data from the Physical Downlink Shared Channel (PDSCH) or transmission of traffic data on the Physical Uplink Shared Channel (PUSCH), according to pre-determined timing specified in the LTE specifications.

Figure 3:
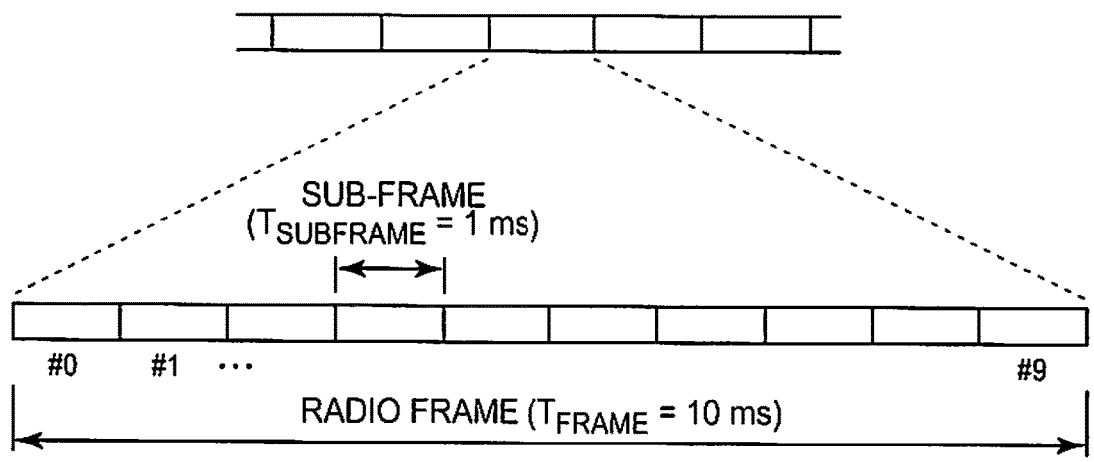
FIG. 3 illustrates the time-domain structure of an LTE signal.

As shown in FIG. 3, LTE downlink transmissions are further organized into radio frames of 10 milliseconds, in the time domain, each radio frame consisting of ten subframes. Each subframe can further be divided into two slots of 0.5 milliseconds duration. Resource allocations in LTE are often described in terms of RB pairs, aggregated in the time direction over two slots, an RB corresponding to one slot (0.5 ms) in the time domain and twelve contiguous subcarriers in the frequency domain. RBs are numbered in the frequency domain, starting with 0 from one end of the system bandwidth.

The signal transmitted by the eNB in a downlink (the link carrying transmissions from the eNB to the UE) subframe may be transmitted from multiple antennas and the signal may be received at a UE that has multiple antennas. The radio channel distorts the transmitted signals from the multiple antenna ports. In order to demodulate any transmissions on the downlink, a UE relies on reference symbols (RS) that are transmitted on the downlink. These reference symbols and their position in the time-frequency grid are known to the UE and hence can be used to determine channel estimates by measuring the effect of the radio channel on these symbols. In FIG. 2, an example distribution of reference symbols 55 is shown; reference symbols 55 make up a cell-specific reference signal (CRS).

One example utilization of multi-antenna techniques that can be applied in LTE is the use of "transmit precoding" to direct the transmitted energy towards one particular receiving UE. With this technique, all available antenna elements for transmission are used to transmit the same message, but individual phase and possibly amplitude weights are applied at each transmit antenna element. This is sometimes denoted UE-specific precoding, and the RS in this case are denoted UE-specific RS. If the transmitted data in the RB is precoded with the same UE-specific precoding as the UE-specific RS, then the transmission is performed using a single virtual antenna, i.e., a single antenna port, and the UE need only to perform channel estimation using this single UE-specific RS and use it as a reference for demodulating the data in this RB.

The UE-specific RS are transmitted only when data is transmitted to a UE in a given RB pair; otherwise they are not present. In LTE, UE-specific RS are included as part of each RB that is allocated to a UE for demodulation of physical downlink shared data channel (PDSCH). Up to 8-layer PDSCH transmission is supported, and therefore there are 8 orthogonal UE-specific RS, as described in 3GPP TS 36.211 (available at www.3gpp.org). These eight different UE-specific RS correspond to antenna ports 7-15 in the 3GPP specifications.

Figure 4:
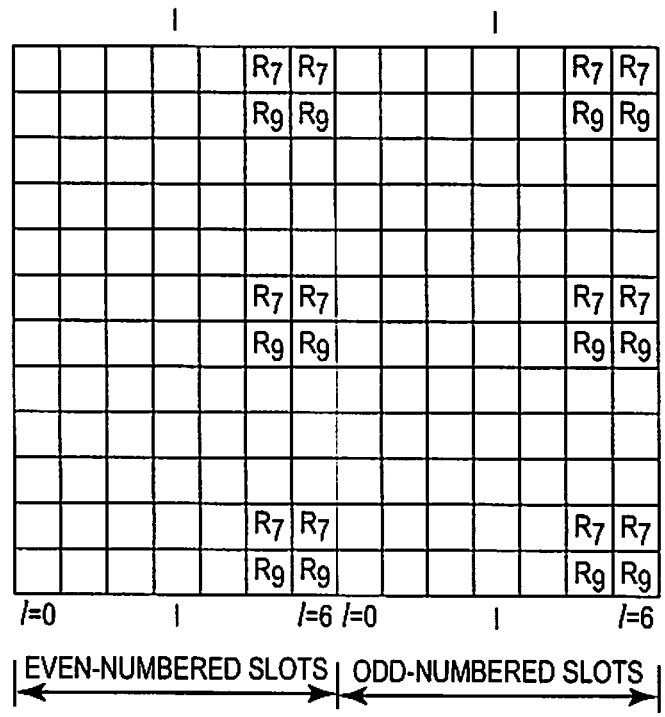
FIG. 4 illustrates the placement of UE-specific reference symbols in an LTE subframe.

Examples of UE-specific reference symbols in the LTE specifications can be found in FIG. 4, which illustrates the locations of two reference signals, denoted R7 and R9, in a RB pair. All resource elements (REs) denoted R7 in that figure belong to a single "RS," hence what is known as an RS is a collection of modulated symbols on a set of REs distributed across the RB pair. These symbols are scrambled by a cell-specific reference signal sequence as follows. For any of the antenna ports $p \in \{7, 8, \ldots, \upsilon+6\}$, where $\upsilon$ is the number of layers, the reference-signal sequence r(m) as a function of the subcarrier index m is defined by:

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases},$$

where $N_{RB}^{max,DL}$ is the largest downlink bandwidth configuration, measured in multiples of RB.

The pseudo-random sequence c(i) used in the function above is defined in Section 7.2 of 3GPP TS 36.211. To produce the correct reference symbols for a given subframe, the pseudo-random sequence generator shall be initialised at the start of each subframe with:

$$c_{init} = (\lfloor n_s/2 \rfloor + 1) \cdot (2N_{ID}^{cell} + 1) \cdot 2^{16} + n_{SCID},$$

where $n_s$ is the slot number and where for antenna ports 7 and 8 $n_{SCID}$ is a binary value given by the scrambling identity field in the most recent transmitted downlink control information (DCI) associated with the PDSCH transmission. If there is no DCI associated with the PDSCH transmission on antenna ports 7 or 8, the UE shall assume that $n_{SCID}$ is zero. For antenna ports 9 to 14, the UE shall also assume that $n_{SCID}$ is zero. Furthermore, $N_{ID}^{cell}$ is the cell identity, obtained from the cell search procedure on the primary and secondary synchronization signals (PSS/SSS).

Accordingly, the reference signal sequence depends on the cell ID. As a result, if the UE-specific reference signals from two different cells are colliding in the time frequency OFDM grid, as might frequently happen at cell-edge UEs in networks with synchronized cells, the different reference signal sequences provide some randomization of the interference. The resulting channel estimation performance will thus improve compared to if the same sequence would have been used in the two cells.

The developing Release 11 standards for LTE include specifications for support of a group of technologies known as coordinated multi-point transmission (CoMP). It has been decided that a UE can be semi-statically configured with a reference signal sequence for the UE-specific RS (antenna port 7-15) in a UE-specific manner, where the initialization values for the scrambling generator are available for dynamic selection. In this case, the dynamic selection of the reference signal sequence is signaled to the UE in the downlink control information transmitted in the downlink control channel.

This is particularly useful in a shared cell scenario. In the shared cell scenario, the same cell ID, $N_{ID}^{cell}$, is used by a group of geographically distributed nodes, which group often includes a macro node and several pico nodes that operate within the coverage area of the macro. Depending on the channel properties, there may be more or less interference between the UE-specific RS used by two pico nodes in the shared cell. Therefore it is useful to configure the reference signal in a UE-specific manner instead of a cell-specific manner. This was the motivation for including this feature in Release 11 of the 3GPP specifications.

Other reference symbols used in LTE can be used by all UEs and thus have wide cell area coverage. One example of these is the common reference symbols (CRS) that are used by UEs for various purposes, including channel estimation and mobility measurements. These CRS are defined so that they occupy certain pre-defined REs within all the subframes in the system bandwidth, irrespectively of whether there is any data being sent to users in any particular subframe. These CRS are shown as "reference symbols" in FIG. 2.

Another type of reference symbol is the channel-state-information RS (CSI-RS). CSI-RS are used for measurements associated with precoding matrix and transmission rank selection for transmission modes that use the UE-specific RS as discussed above. For the CSI-RS, there are also ongoing standardization efforts to allow for configurable reference signal sequences in a UE-specific manner, for the same reasons discussed above for the UE-specific RS.

Messages transmitted over the radio link to users can be broadly classified as control messages or data messages. Control messages are used to facilitate the proper operation of the system as well as proper operation of each UE within the system. Control messages include commands to control functions such as the transmitted power from a UE, to signal allocations of the RBs within which data is to be received by the UE or transmitted from the UE, and so on. Some control messages are conveyed via the physical downlink control channel (PDCCH), which carries scheduling information and power control messages. Other control channels include the physical HARQ indicator channel (PHICH), which carries ACK/NACK in response to a previous uplink transmission, and the physical broadcast channel (PBCH), which carries system information. The PBCH is not scheduled by a PDCCH transmission but has a fixed location relative to the primary and secondary synchronization signals (PSS/SSS). Therefore the UE can receive the system information from BCH before it is able to read the PDCCH.

In systems operating according to LTE Release 10 specifications, control messages to UEs are demodulated using the CRS. Hence, these control messages have a wide cell coverage, to reach all UEs in the cell, without the system having knowledge about the UEs' positions. The first one to four OFDM symbols, depending on the configuration, in a subframe are reserved for control information. (See FIG. 2.)

Control messages can be categorized into those types of messages that need to be sent only to one UE (UE-specific control) and those that need to be sent to all UEs or some subset of UEs numbering more than one (common control), within a cell being covered by a given eNB.

It should be noted in this context that in future LTE releases there will be new carrier types that may not include a PDCCH transmission or transmission of CRS, and which therefore will not be backward compatible. Such a carrier type is introduced in Release 11. With the use of carrier aggregation, this new carrier type is aggregated with a legacy (backward compatible) carrier type, which does include PDCCH and CRS. However, in future releases of LTE it may also be possible to have stand-alone carriers of this sort, i.e., carriers that do not have PDCCH or CRS but that are also not associated with a legacy carrier.

Figure 5:
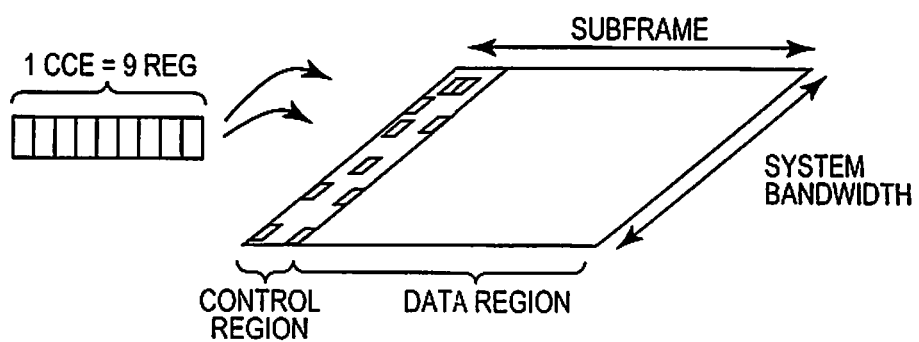
FIG. 5 illustrates the distribution of PDCCH CCEs in the control region of an LTE subframe.

Control messages of PDCCH type are demodulated using CRS and transmitted in multiples of units called control channel elements (CCEs), where each CCE contains 36 REs. Each PDCCH may have an aggregation level of one, two, four, or 8 CCEs, to allow for link adaptation of the control message. Furthermore, each CCE is mapped to nine resource element groups (REGs) consisting of four RE each. These REGs are distributed over the whole eNB bandwidth, to provide frequency diversity for a CCE. Hence, a PDCCH, which consists of up to eight CCEs, spans the entire system bandwidth in the first one to four OFDM symbols, depending on the configuration. This is shown in FIG. 5.

Transmission of the physical downlink shared data channel (PDSCH) to UEs uses those REs in each RB pair that are not used for control messages or RS. The PDSCH can be transmitted using either the UE-specific RS or the CRS as a demodulation reference, depending on the PDSCH transmission mode. The use of UE-specific RS allows a multi-antenna eNB to optimize the transmission using pre-coding of both data and reference signals being transmitted from the multiple antennas so that the received signal energy increase at the UE. Consequently, the channel estimation performance is improved and the data rate of the transmission can be increased.

Figure 6:
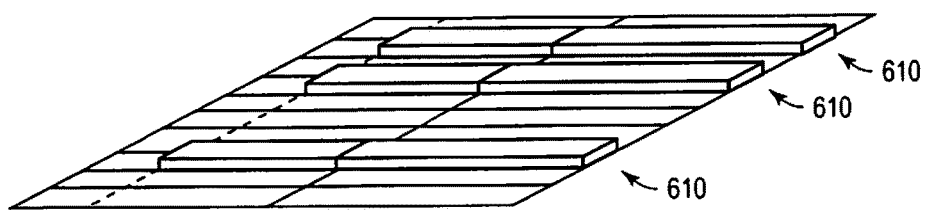
FIG. 6 illustrates enhanced control channel regions in an LTE subframe.

In Release 10 of LTE, a relay control channel was also defined, denoted R-PDCCH. The R-PDCCH, which is used for transmitting control information from eNB to relay nodes, is placed in the data region and is thus similar to a PDSCH transmission. The transmission of the R-PDCCH can either be configured to use either a common reference signal (CRS) to provide wide cell coverage or relay node (RN)-specific reference signals to improve the link performance towards a particular RN by precoding, in a manner that is similar to how the PDSCH is transmitted with UE-specific RS. In the latter case, the UE-specific RS is used for the R-PDCCH transmission. The R-PDCCH occupies a specific number of configured RB pairs in the system bandwidth and is thus frequency multiplexed with the PDSCH transmissions filling in the remaining RB pairs. An example is shown in FIG. 6, which illustrates a downlink subframe, showing ten RB pairs and the transmission of three R-PDCCH 610, of size one RB pair each. Note that the R-PDCCH does not start at OFDM symbol zero, thus allowing for a PDCCH to be transmitted in the first one to four symbols. The RB pairs between the R-PDCCH can be used for PDSCH transmissions.

As noted above, in LTE Release 11 discussions attention has turned towards adopting these same techniques to support enhanced control channels, including enhanced versions of PDCCH, PHICH, PCFICH, and PBCH. Thus, the same principle of UE-specific transmission as discussed above for the PDSCH and the R-PDCCH is applied to the enhanced control channel, thus allowing the transmission of generic control messages to a UE based on UE-specific reference signals. These enhanced control channels are commonly known as the enhanced PDCCH (ePDCCH), enhanced PHICH (ePHICH), and so on.

More particularly, it has been agreed to use antenna ports $p \in \{7, 8, 9, 10\}$ for demodulation of the enhanced control channels. These are the same antenna ports that are used for PDSCH transmissions based on UE-specific RS. This enhancement means that precoding gains can be achieved also for the control channels. Another benefit is that different RB pairs (or enhanced control regions) can be allocated to different cells or different transmission points within a cell, and thereby inter-cell or inter-point interference coordination between control channels can be achieved.

Alternatively, the same enhanced control region can be used in different transmission points within a cell or in transmission points belonging to different cells that are not highly interfering with each other. A typical case is the shared cell scenario, where a macro cell contains lower-power pico nodes within its coverage area, which have (or are associated to) the same synchronization signal/cell ID used by the macro node.

Figure 7:
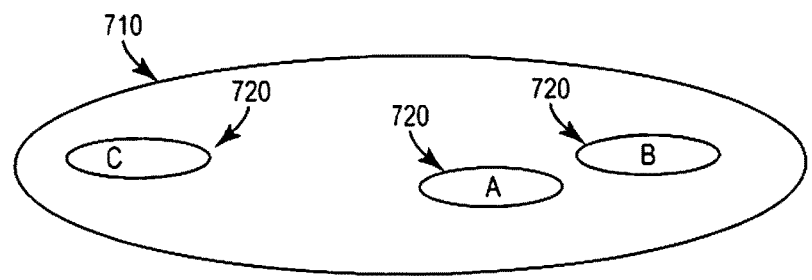
FIG. 7 illustrates a heterogeneous cell deployment in a wireless network.

An example of this scenario is illustrated in FIG. 7, where region 710 represents the macro node coverage area and regions 720 correspond to the coverage areas for pico nodes A, B, and C. In a shared cell scenario A, B, C and the macro cell have the same cell ID, e.g., the same synchronization signal (i.e., transmitted or being associated to the same synchronization signal).

For pico nodes that are geographically separated, such as pico nodes B and C in FIG. 7, the same enhanced control region, i.e., the same physical resource blocks (PRBs) used for the ePDCCH, can be re-used. On the other hand, pico node A is quite close to pico node B and is thus at risk of interfering with and receiving interference from pico node B. Accordingly, different enhanced control channel regions (i.e., different PRBs) should be used for enhanced control channel transmissions by pico node A. Interference coordination between pico nodes or other transmission points within a shared cell is thereby achieved—in this manner the total control channel capacity in the shared cell is increased, since a given PRB resource is re-used, potentially multiple times, in different parts of the cell.

Figure 8:
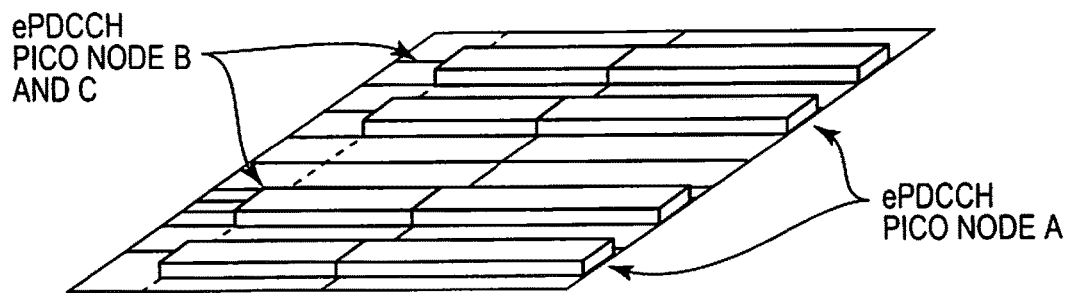
FIG. 8 illustrates an example mapping of enhanced control channels to nodes in a heterogenous cell deployment.

FIG. 8 illustrates this reuse of PRB resources for the scenario illustrated in FIG. 7. As seen in FIG. 8, the first and third ePDCCH resources are used for ePDCCH transmissions in both pico nodes B and C, since these nodes are sufficiently separated to avoid interference between the ePDCCH. The second and fourth ePDCCH resources are used by pico node A alone. It should be appreciated that this area splitting and control channel frequency coordination is not possible with the PDCCH, since the PDCCH spans the whole system bandwidth.

Figure 9:
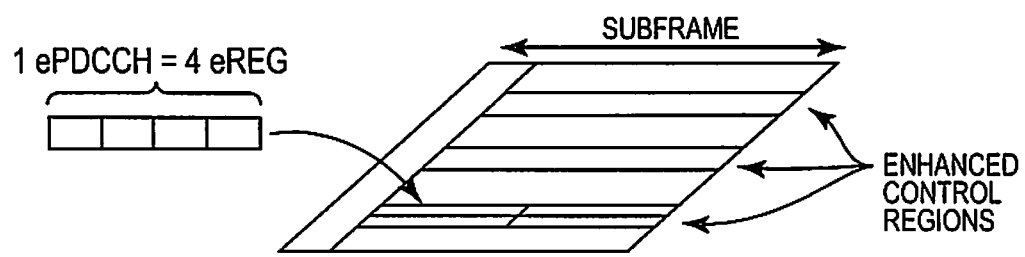
FIG. 9 shows localized mapping of an ePDCCH to an enhanced control channel region in an LTE subframe.

FIG. 9 illustrates an example mapping of an ePDCCH to the enhanced control region of an LTE subframe. In this example, the ePDCCH includes a CCE, made up of 4 eREGs, and is divided into multiple groups. In the approach illustrated in FIG. 9, the entire ePDCCH is mapped to a single one of the enhanced control regions in a subframe, thus achieving localized transmission. Note that in FIG. 9, the enhanced control region does not start at OFDM symbol zero, to accommodate simultaneous transmission of a PDCCH in the subframe. However, as was mentioned above, there may be carrier types in future LTE releases that do not have a PDCCH, in which case the enhanced control region could start from OFDM symbol zero within the subframe.

Even though the enhanced control channel enables UE-specific precoding and localized transmission, as illustrated in FIG. 9, in some cases it can be useful to be able to transmit an enhanced control channel in a broadcasted, wide-coverage-area fashion. This is useful in the event that the eNB does not have reliable enough information to perform pre-coding towards a certain UE, in which case a wide area coverage transmission is more robust, even though the precoding gain is lost, or at least reduced, depending on the channel properties of the UEs involved in the reception and on whether the eNB is able to take the channel properties into account. Another case is when the particular control message is intended for more than one UE; in this case, UE-specific precoding cannot be used. An example of transmitting control data intended for more than one UE is the transmission of common control information (i.e., in the common search space). In yet another case, it may be desirable in some situations to utilize subband precoding—since the UE estimates the channel in each RB pair individually, the eNB can choose different precoding vectors in the different RB pairs, if the eNB has such information that the preferred precoding vectors is different in different parts of the frequency band.

Figure 10:
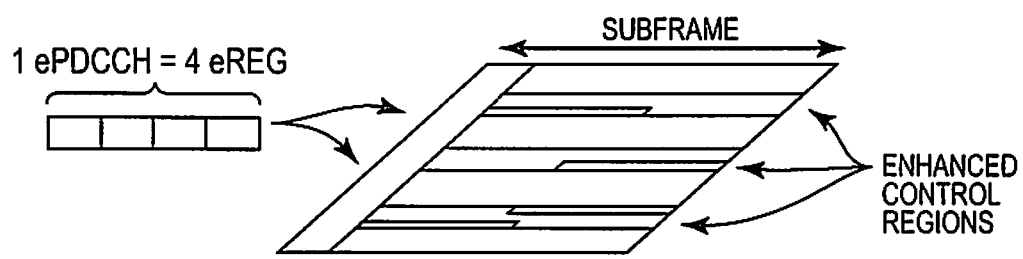
FIG. 10 shows distributed mapping of an ePDCCH to multiple enhanced control channel regions in an LTE subframe.

In any of these cases, a distributed transmission of ePDCCH over multiple enhanced control regions can be used. For an example, see FIG. 10, where the eREG belonging to the same ePDCCH are distributed over several enhanced control regions. Here, the ePDCCH again comprises a CCE, consisting of four eREGs. This time, however, the eREGs are distributed over three control regions. This distributed transmission of the ePDCCH exploits frequency diversity and enables subband precoding.

The enhanced control channel according to Release 11 LTE specifications will use the UE-specific RS, as shown in FIG. 4, as the reference for demodulation. The ePDCCH will use one, some, or all the antenna ports $p \in \{7, 8, 9, 10\}$ for a demodulation reference, depending on the number of antenna ports needed in a RB pair, as discussed further below.

The enhanced control region (e.g., a RB or RB pair) can be divided into time-frequency resources, denoted enhanced resource element groups (eREG). Each of the time frequency resources is associated with a unique RS from the set of UE-specific RS, which RS is located in the same RB or RB pair. This is equivalent to saying that each of the ePDCCH time-frequency resources (eREGs) is associated with a particular antenna port. When a UE demodulates the information in a given eREG of the RB or RB pair, it uses the RS/antenna port associated with that eREG.

Figure 11:
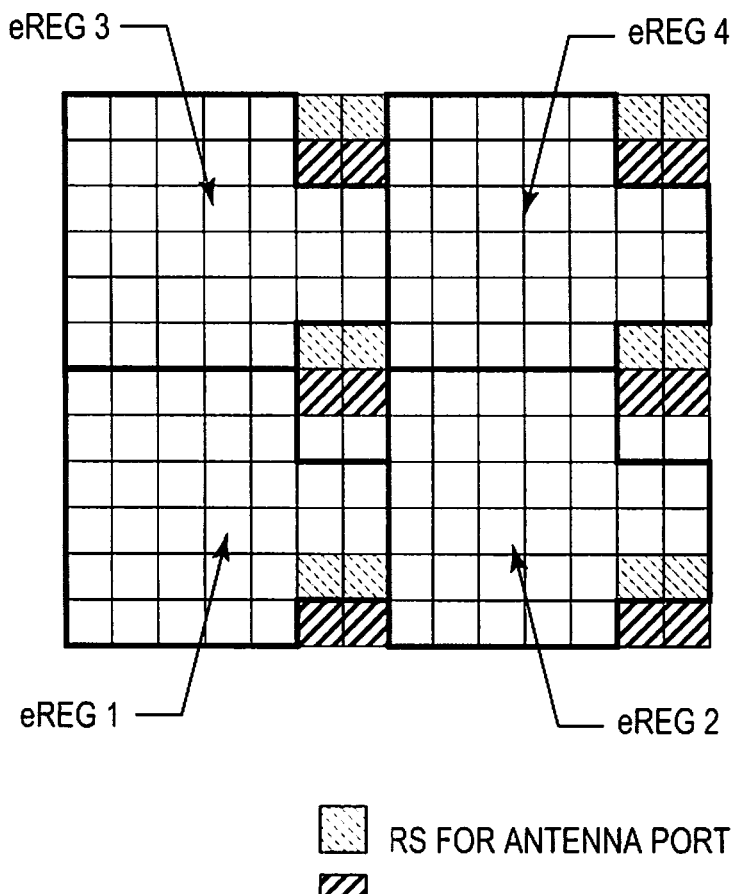
FIG. 11 illustrates an example allocation of eREGs to a RB pair.

Furthermore, each resource in an RB or RB pair can be independently assigned to UEs. This is illustrated in FIG. 11, which shows an example of a downlink RB pair with four enhanced resource element groups (eREG), each consisting of 72 RE, and two antenna ports (AP).

In this example, each eREG is associated with an antenna port (AP), and each AP is associated with two eREGs. This is shown in the node diagram illustrated in FIG. 12. Here it can be seen that eREG 1 and eREG 3 are associated with antenna port (AP) 7. When a UE demodulates part of an ePDCCH transmitted eREG1, for example, it will use the RS associated with AP 7 for demodulation. When a UE demodulates an ePDCCH transmitted in eREG1 and eREG2, it will use both AP7 and AP9 for demodulation of the corresponding parts of the ePDCCH message. In this way antenna diversity can be obtained for the ePDCCH if multiple antennas are available at the eNB and AP7 and AP9 is mapped to different antennas.

Figure 12:
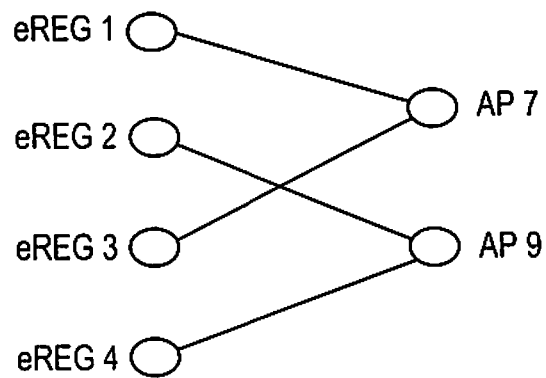
FIG. 12 is a node diagram illustrating an example association between eREGs and antenna ports.

Note that even if multiple orthogonal RS are used in the RB or RB pair, there is only one layer of control data transmitted. As can be seen in FIG. 12, it is possible that more than one eREG is using a given AP, which is possible since the eREG are orthogonal in the time-frequency OFDM grid. Note that in the case illustrated in FIG. 12, both eREG1 and eREG3 use the same precoding vector, since they use the same antenna port. If the ePDCCH use all eREG in a PRB pair, e.g., according to FIG. 12, antenna diversity or precoding beam diversity can be achieved. This can be useful in the case the preferred precoding vector is unknown at the eNB side, or if the control message is intended for multiple UEs (e.g., a common control channel), as was discussed above.

Figure 13:
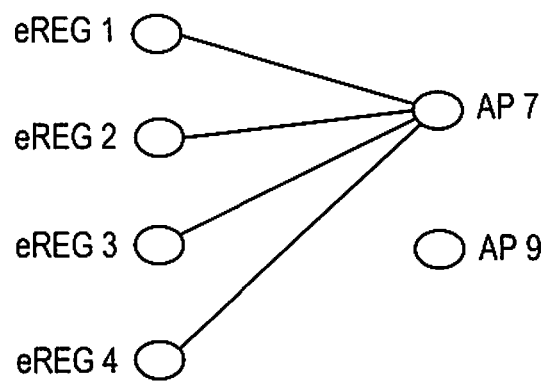
FIG. 13 is another node diagram illustrating an example association between eREGs and antenna ports.

Alternatively, if the ePDCCH use all the eREG in a PRB pair and the eNB chooses to perform precoding to a single UE with a same precoder for all eREG, then only one antenna port needs to be used, and UE-specific precoding can then be applied to the whole ePDCCH message. The related node diagram for this case is shown in FIG. 13, where all eREG are used for one UE and thus only one of the two APs needs to be used.

Each transmitted enhanced control channel resource, or eREG, contains control information that may include, but is not limited to, an enhanced PDCCH, a CCE or a fraction of a CCE, an enhanced PHICH or an enhanced PBCH. If the resource/eREG is too small to fit a whole enhanced PDCCH, CCE, PHICH or PBCH, a fraction can be transmitted in the eREG and the other fraction in other eREGs in other RBs or RB pairs elsewhere in the same subframe, as was shown in FIG. 10.

However, there are several problems with the present approach to assigning and applying reference signals to the transmission of enhanced control channels. One problem is how to assign reference signal sequences to achieve robust channel estimation for demodulating the enhanced control channels especially in shared cell scenarios where cell or area splitting is used for the enhanced control channels. Another problem is how to assign reference signal sequences to achieve robust channel estimation for demodulating the enhanced control channels belonging to the common search space. Still another problem is how to assign reference signal sequences for demodulating enhanced control channels that is used for initial access to a carrier, for example to receive system information. Further, how to assign reference signal sequences for demodulating enhanced control channels that is used for initial access to a stand-alone carrier type is a problem. Finally, it is also a problem how to minimize signaling overhead for configuring the reference signal sequences.

In several embodiments of the present invention, which address one or more of the above problems, the reference signal sequence used for the RS associated with antenna port $p \in \{7, 8, 9, 10\}$ in an enhanced control channel (eCCH) transmission is not a fixed and given sequence for a given cell, but is one of a set of different reference signal sequences. Which sequence to use for a particular eCCH is determined by the transmitting node and/or the UE based on one or several factors such as whether the eCCH belongs to a UE-specific or a common search space, whether the eCCH belongs to a localized or distributed transmission of eCCHs, whether the eCCH is of a broadcast or a unicast type, whether the eCCH is a random access response, a paging message, etc., and/or whether the eCCH belongs to a message read at initial access to the carrier, such as the system information.

As a result, a transmitting node will use different reference signal sequences for different types of enhanced control channels, even if those different types of enhanced control channels are transmitted at the same time. Because those different types of enhanced control channels may be targeted to different UEs or groups of UEs, or may be making different uses of frequency diversity, etc., the associated reference signal sequences may be transmitted from different sets of transmission points controlled by the transmitting node, or using different precoder vectors, or both.

Furthermore, the reference signal sequence initialization used for a RS associated with antenna port $p \in \{7, 8, 9, 10\}$ in an enhanced control channel (eCCH) transmission, belonging to the set described above, can be related to the initialization of the reference signal sequence of other RS such as the initialization value the UE assumes for a configured CSI-RS for CSI feedback measurements, the initialization value the UE assumes for a configured CSI-RS for synchronization purposes, the initialization value the UE assumes for one of the dynamically selected UE-specific RS for PDSCH transmission, and/or the initialization value obtained from the synchronization process on the carrier.

Figure 14:
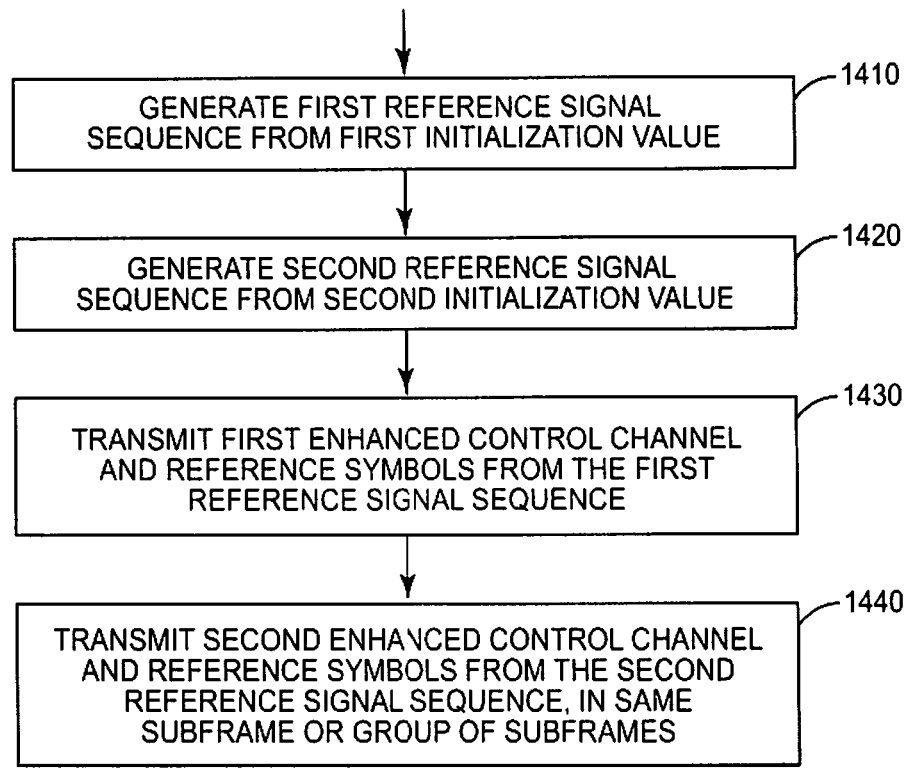
FIG. 14 is a process flow diagram illustrating an example technique for transmitting enhanced control channels.

FIG. 14 is a process flow diagram illustrating a general method, according to the techniques summarized above, as might be implemented by a wireless base station. The illustrated method begins, as shown at block 1410, with the generating of a first reference signal sequence from a first initialization value. As shown at block 1420, a second reference signal sequence is also generated, from a second initialization value. These two reference signal sequences are associated with two enhanced control transmissions; thus, as shown at block 1430, a first enhanced control channel and reference symbols taken from the first reference signal sequence are transmitted, using a first set of time-frequency resources and using a first set of transmission points or a first set of antenna ports, or both. As seen at block 1440, a second enhanced control channel and reference symbols taken from the second reference signal sequence are also transmitted, using a differing second set of antenna ports, or a differing second set of time frequency resources, or a differing second set of transmission points, or any combination of these differing second sets. The second enhanced control channel and its associated reference symbols are transmitted in the same subframe or group of subframes in which the first enhanced control channels and reference symbols from the first reference signal sequence are transmitted.

As will be discussed in further detail below, the first and second enhanced control channels referred to in FIG. 14, having associated reference symbols taken from different reference signal sequences, are of different types. For example, in some cases the first enhanced control channel is targeted to a common search space and the second enhanced control channel is targeted to a UE-specific search space. One or the other of the enhanced control channels may be a random access response, for example, or a paging message, or a broadcast control message. In some instances, the first enhanced control channel is distributed among two or more frequency-diverse enhanced control channel regions in the downlink subframe or subframes, while the second enhanced control channel is transmitted from a single, frequency-localized enhanced control channel region.

In some embodiments, the first reference signal sequence is the same used for transmitting a channel-state-information reference signal. In some of these or in other cases, the second initialization value is the same as or is derived from an initialization value used to obtain demodulation reference signals for a traffic channel transmission. In other embodiments, one of the initialization values is derived from information contained in a synchronization sequence transmitted by the wireless base station.

In the following discussion, several different scenarios and types of enhanced control channel transmissions are described in detail, along with corresponding approaches to selecting the associated demodulation reference signals to be transmitted with the enhanced control channels. It should be noted that the techniques for handling these different scenarios can be combined in a single implementation, e.g., in the design of a wireless base station or base station control system, or in the design of a corresponding receiving wireless device, such as a mobile station configured to support the Release 11 specifications for LTE. It should also be readily appreciated that signals and operations performed by a wireless base station in forming and transmitting an enhanced control channel imply corresponding signals and operations at a UE receiving enhanced control channel transmissions from the base station, and vice-versa.

In a first set of scenarios handled according to the techniques summarized above, the UE is configured to use a first reference signal sequence initialization, $c_{init}(1)$, when demodulating an ePDCCH transmitted in the common search space, or when receiving a random access response, or a paging message, or a broadcasted system information message. The UE is configured to use a second reference signal sequence initialization, $c_{init}(2)$, when demodulating a eCCH transmitted in the UE-specific search space.

Since these initialization values are UE-specific in general, area splitting gains are obtained for the ePDCCH. Furthermore, since $c_{init}(1)$ is used to transmit information to multiple UEs or to an undisclosed recipient UE, as in the common search space, the same value is configured to all the UEs that are intended to receive such control message.

In some systems, these values $c_{init}(1)$ and $c_{init}(2)$ are inferred by the UE from information provided by dedicated RRC signaling. A formula can be defined to infer the values from the signaled parameter. As an example, the initialization value $$c_{init}(m) = (\lfloor n_s/2 \rfloor + 1)(2X_m+1) \cdot 2^{16}$$

can be used where $n_s$ is the slot number and $X_m$, m=1, 2 is configurable (e.g., by RRC signalling) in a UE-specific manner. In some embodiments, the parameter $X_m$ can take on any value in the range of 0 to 503. Alternatively, one of the parameters $X_m$, m=1, 2 are obtained from the synchronization signals used to synchronize the carrier. This can be used for a new carrier type or for future stand-alone carrier types.

As an further example, the initialization value $$c_{init}(m) = 2^{10} \cdot (7 \cdot (n_s+1)+1) \cdot (2X_m+1) + 2X_m + N_{CP}$$

can be used, where $n_s$ is the slot number, $N_{CP}$ is 0 or 1, depending on the length of the cyclic prefix, and $X_m$, m=1, 2 is configurable in a UE-specific manner. In some embodiments, the parameter $X_m$ can take on any value in the range of 0 to 503.

Figure 15:
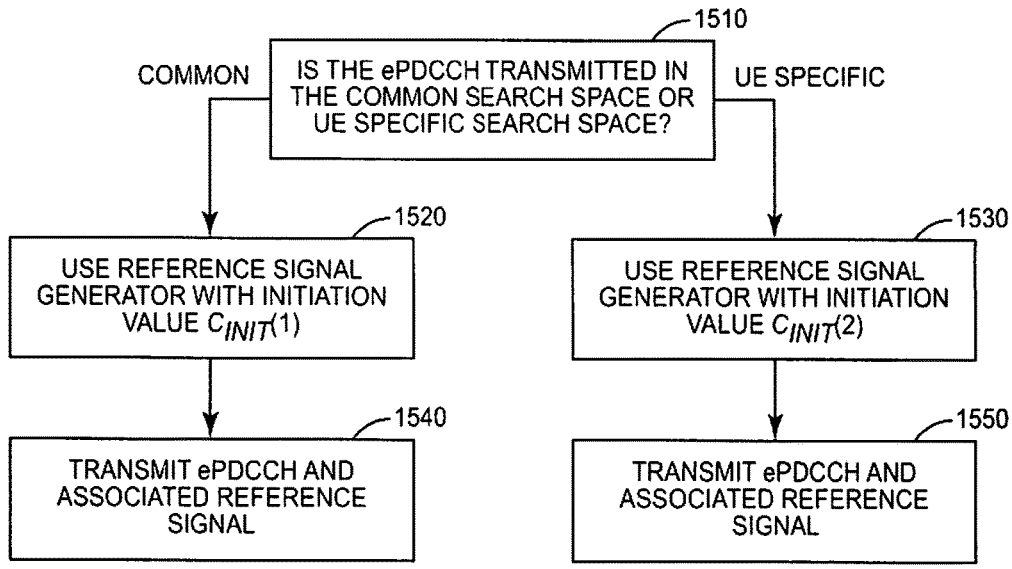
FIGS. 15 and 16 are process flow diagrams illustrating how a base station and a mobile station, respectively, carry out one example technique for selecting and applying reference signal sequences to enhanced control channel transmissions.
Figure 16:
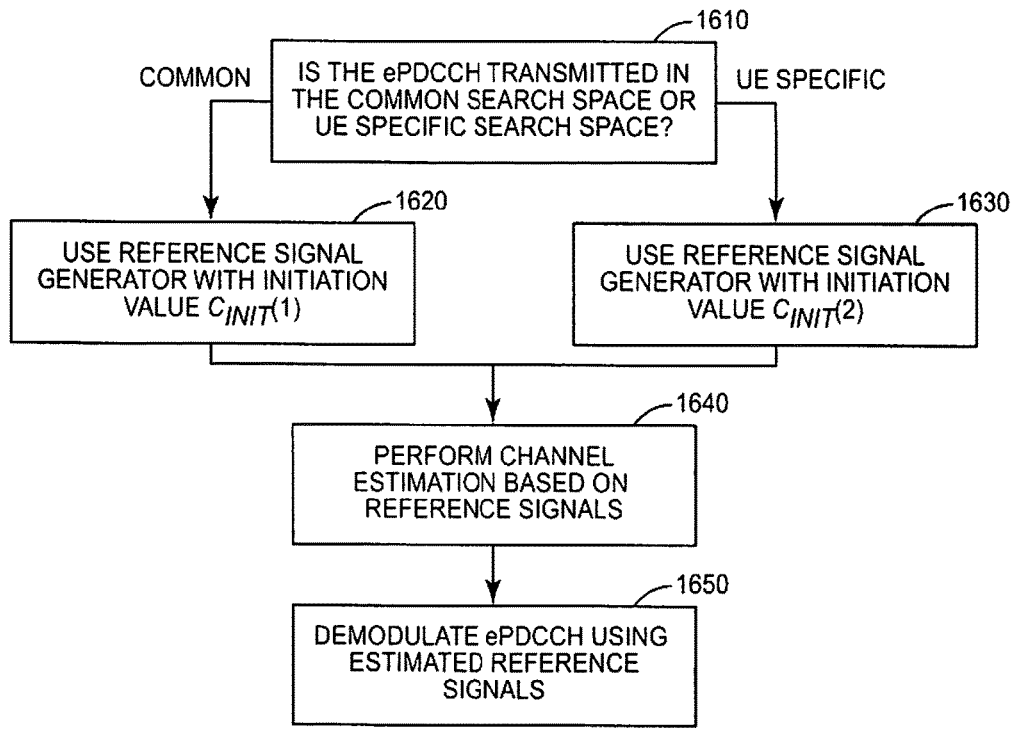

FIGS. 15 and 16 illustrate examples of how the eNB and UE, respectively, carry out this technique for downlink transmissions. As seen at block 1510, for a given enhanced control channel transmission, the eNB determines whether the ePDCCH is transmitted in the common search space or a UE-specific search space. As shown at blocks 1520 and 1530, the initialization value used to generate the reference signal sequence varies, depending on the targeted search space. As shown at blocks 1540 and 1550, the ePDCCH is then transmitted, along with reference symbols taken from the reference signal sequence associated with either the common search space or UE-specific search space, as appropriate.

FIG. 16 illustrates corresponding operations in the mobile station. As shown at block 1610, the mobile station first determines whether an ePDCCH of interest is transmitted in the common search space or a UE-specific search space. As seen at blocks 1620 and 1630, the reference signal sequence is generated with different initialization values, depending on which is the case. As seen at blocks 1640 and 1650, the mobile station then performs channel estimation, based on reference symbols taken from the reference signal sequence, and demodulates the ePDCCH using the results of the channel estimation.

In a second set of scenarios handled according to the general techniques summarized earlier, when distributed transmission is used, the same antenna port associated with a UE-specific RS may be used by multiple UEs to demodulate their distributed control channels. So, in a sense, the UE-specific RS is actually a RS common to a group of UEs, also known as a group-UE-specific RS.

In these embodiments, the UE is configured to use a first reference signal sequence initialization, $c_{init}(1)$, when demodulating an ePDCCH transmitted by distributed transmission, i.e., when the ePDCCH is broken into several portions distributed among two or more frequency-diverse enhanced control channel regions of a downlink subframe or subframes. The UE is configured to use a second reference signal initialization, $c_{init}(2)$, when demodulating an eCCH transmitted by localized transmission, i.e., in a single, frequency-localized enhanced control channel region of the downlink subframe or subframes.

Figure 17:
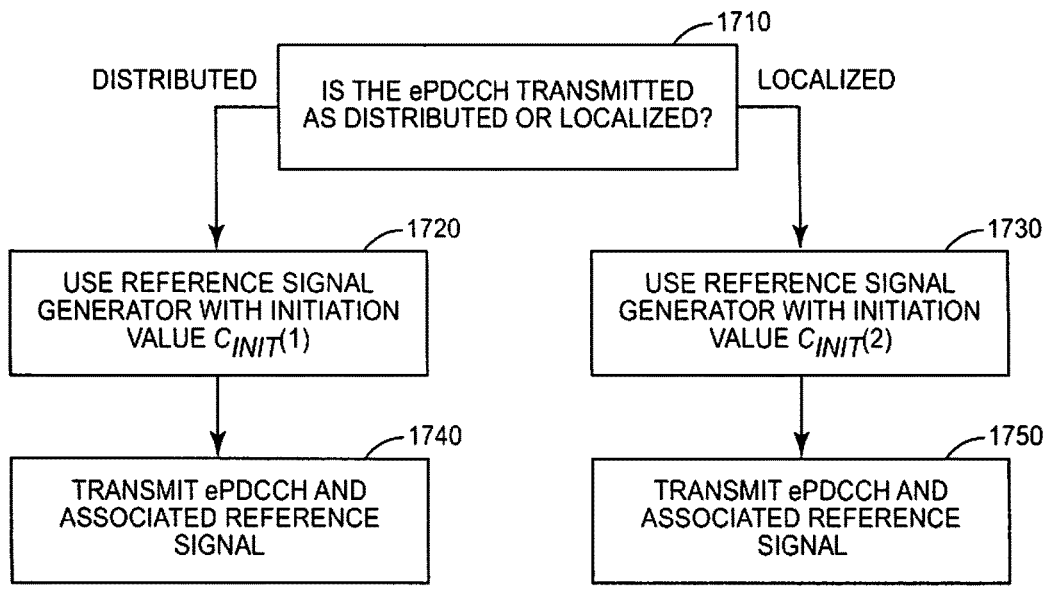
FIGS. 17 and 18 are process flow diagrams illustrating how a base station and a mobile station, respectively, carry out another example technique for selecting and applying reference signal sequences to enhanced control channel transmissions.
Figure 18:
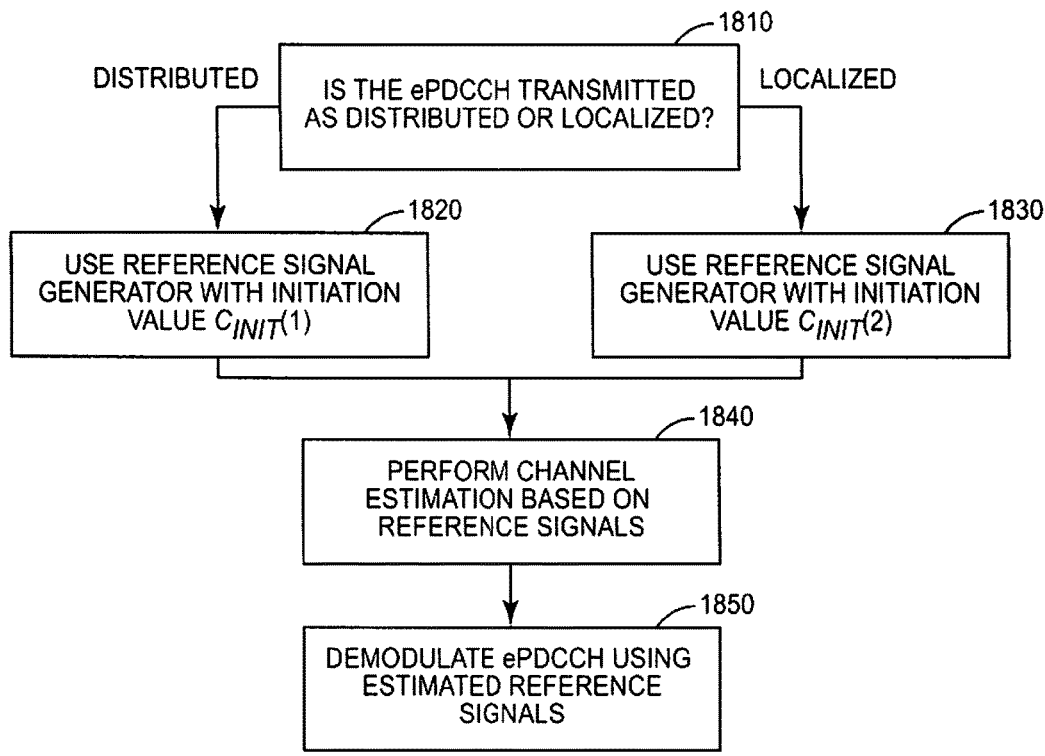

FIGS. 17 and 18 illustrate examples of this technique as implemented by an eNB and UE, respectively, for downlink transmission. As seen at block 1710, for a given enhanced control channel transmission the eNB determines whether the ePDCCH is to be transmitted as a distributed or localized transmission. As shown at blocks 1720 and 1730, the initialization value used to generate the reference signal sequence varies, depending on which is the case. As shown at blocks 1740 and 1750, the ePDCCH is then transmitted, along with reference symbols taken from the reference signal sequence associated with either distributed or localized transmission, as appropriate.

FIG. 18 illustrates corresponding operations in the mobile station. As shown at block 1810, the mobile station first determines whether an ePDCCH of interest is transmitted in a distributed or localized fashion. As seen at blocks 1820 and 1830, the reference signal sequence is generated with different initialization values, depending on which is the case. As seen at blocks 1840 and 1850, the mobile station then performs channel estimation, based on reference symbols taken from the reference signal sequence, and demodulates the ePDCCH using the results of the channel estimation.

Since these initialization values are UE-specific in general, area splitting gains are again obtained for the ePDCCH. Furthermore, since $c_{init}(1)$ is used for the distributed transmission, the same value is configured to all the UEs that are intended to receive the same control message.

These values $c_{init}(1)$ and $c_{init}(2)$ may be inferred from information provided by dedicated RRC signaling. Examples of several approaches were given above. As an alternative, one of the parameters $X_m$, m=1, 2 can be obtained from the synchronization signals used to synchronize the carrier. In this way the configuration of the UE can be performed without using RRC signaling and can thus be used to find the initialization value to be used for a new carrier type and for future stand-alone carriers. On such stand-alone carriers it is then possible to demodulate an ePDCCH, to receive further system information in a PDSCH transmission directly after synchronization.

In some embodiments of either or both of the approaches detailed above, the first initialization value $c_{init}$ (1) is tied to the UE-specific reference signal configuration for the CSI-RS. Thus, the parameter or parameters determining the sequence initialization of CSI-RS affect $c_{init}$ (1) as well. In this way, all UEs that are assigned to measure on the same CSI-RS are also assigned to the same reference signal sequence of the RS to demodulate the ePDCCH. RRC signaling overhead to indicate $c_{init}$ (1) is thus reduced or removed.

The initialization value for the CSI-RS is:

$$c_{init}(m)=2^{10}\cdot(7\cdot(n_s+l+1)+1)\cdot(2X+1)+2X+N_{CP},$$

where X is configurable in a UE-specific manner and may take on any value in the range of 0 to 503 and where l is the OFDM symbol number within the slot. In one embodiment, to obtain $c_{init}(1)$, the same formula can be used with a predetermined value for l, e.g., l=0.

Figure 19:
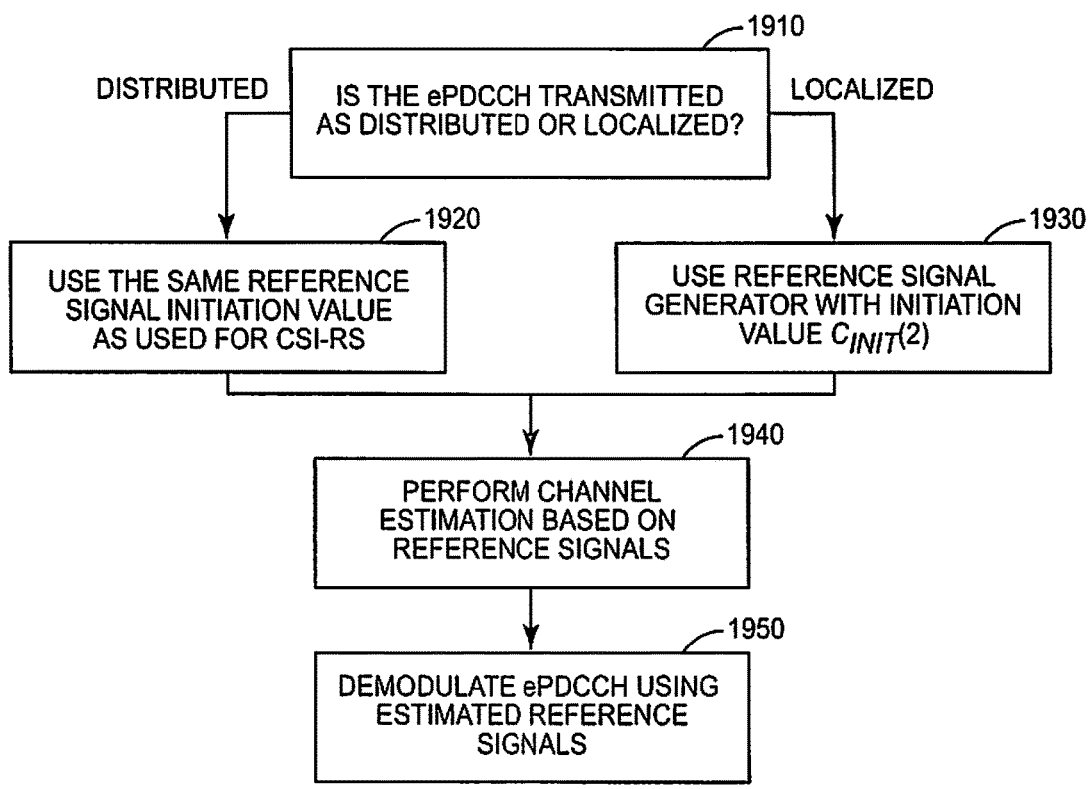
FIG. 19 is another process flow diagram illustrating an example technique carried out by a mobile station.

This approach is illustrated in FIG. 19, from the perspective of the mobile station, for the scenario in which the mobile station is distinguishing between distributed and localized transmission of an ePDCCH. It will be appreciated that the same or similar approach can be used when distinguishing between enhanced control channel transmissions in the common search space and a UE-specific search space, however. As shown at block 1910, the mobile station first determines whether an ePDCCH of interest is transmitted in a distributed or localized fashion. In the former case, as seen at block 1920, the reference signal sequence is generated using the same initialization value used for CSI-RS generation. As seen at block 1930, the reference signal sequence is generated with a different initialization value, in the event of localized transmission. As seen at blocks 1940 and 1950, the mobile station then performs channel estimation, based on reference symbols taken from the reference signal sequence, and demodulates the ePDCCH using the results of the channel estimation.

If a UE is configured to measure on multiple non-zero-power CSI-RS reference signals, then the UE uses the same reference signal sequence initialization value used for one of those reference signals, or an initialization value derived from it. Which CSI-RS reference signal to use as a basis for determining the UE-specific RS initialization value is based on a predetermined rule, in some embodiments, or based on dedicated signaling in a RRC message, in others.

It should be noted that there have also been discussions on using the CSI-RS to aid the synchronization. In this case a pre-defined CSI-RS configuration, including a predefined initialization of the reference signal is used. One of the parameters $X_{init}$, m=1, 2 is then obtained from the CSI-RS used (partly or fully) as synchronization signals used to synchronize the carrier. In this way is the configuration done without using RRC signalling and can thus be used to find the initialization value to be used for a new carrier type and also for future stand-alone carriers. On such stand-alone carriers it is then possible to demodulate an ePDCCH, to further receive system information in a PDSCH transmission directly after synchronization.

In some implementations of any of the approaches detailed above, $c_{init}(2)$ is tied to or is related to the initialization value used to generate the UE-specific RS used to demodulate the PDSCH transmission. For PDSCH, there is a set of dedicated and RRC-configured scrambling sequence initialization values. When scheduling the UE, which one of the values to use is determined by information in the scheduling message transmitted by the PDCCH or by the ePDCCH. Hence, dynamic selection of the initialization value is obtained. This dynamic information is carried in the parameter $n_{SCID}$. As an example, the initialization value is given by:

$$c_{init}=(\lfloor n_s/2 \rfloor+1)(2X+1)\cdot 2^{16}+n_{SCID},$$

where X is obtained from dedicated RRC signaling or detected from synchronization signals. In another embodiment, the initialization value is given by:

$$c_{init}=(\lfloor n_s/2 \rfloor+1)(2g(X,n_{SCID})+1)\cdot 2^{16},$$

where g is a function that provides an integer output given the semi-statically signaled value X and the dynamically signaled value $n_{SCID}$.

When demodulating the ePDCCH, the initialization value for the RS used to perform channel estimation to receive the ePDCCH may be one of the values used to initialize the RS used to demodulate the PDSCH. Since there are multiple values of the value $n_{SCID}$ for the PDSCH, the UE must know which one of them to assume when demodulating the ePDCCH. This problem is solved by assigning a predetermined value. As an example, $n_{SCID}=0$ can always be used for the ePDCCH demodulation. Hence, in one embodiment the initialization value used for the ePDCCH is determined by:

$$c_{init}=(\lfloor n_s/2 \rfloor+1)(2g(X,n_{SCID})+1)\cdot 2^{16},$$

Hence, the same formula as for the sequence generation of the PDSCH transmission can be used for the eCCH transmission.

In general, one of the RS sequence initializations, out of the set of RS sequences possible to choose dynamically for PDSCH transmission, is predetermined to be used for eCCH transmissions.

Figure 20:
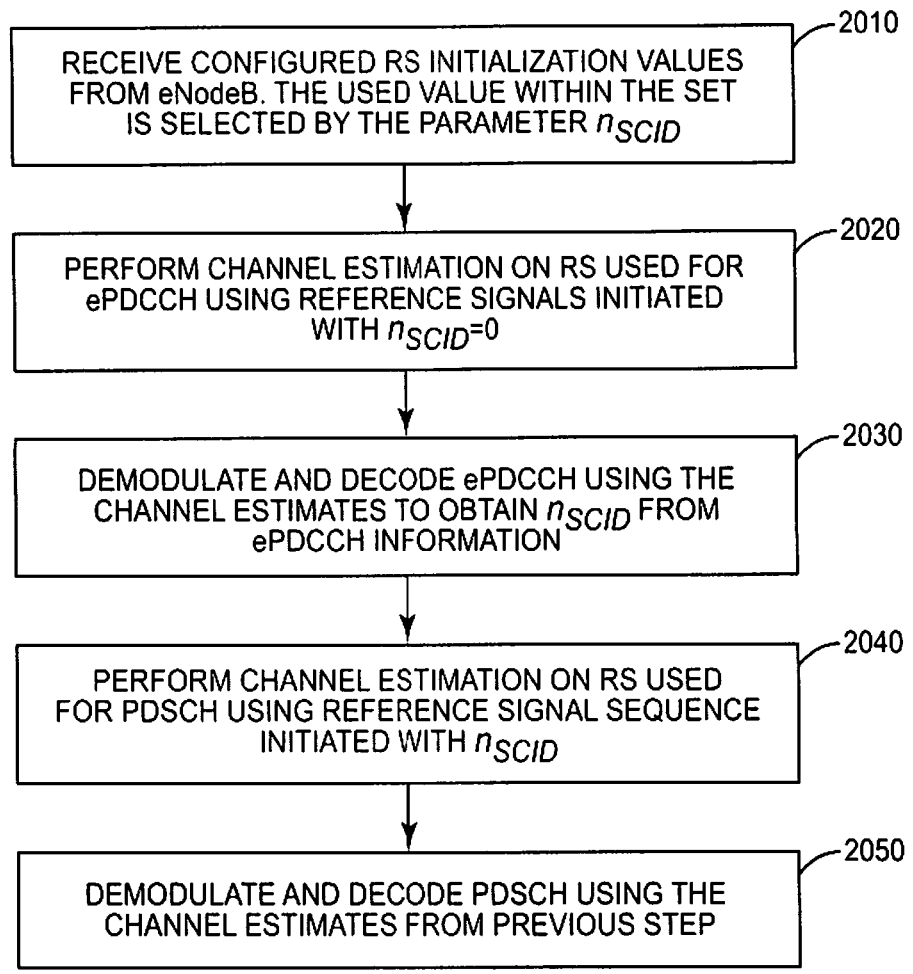
FIG. 20 is still another process flow diagram illustrating another example technique carried out by a mobile station.

FIG. 20 illustrates an example of the operations performed by the UE according to this approach. As shown at block 2010, a set of RS initialization values are configured for the UE by the eNB, using dedicated RRC signaling. The particular value within the set to be used is selected by the parameter $n_{SCID}$. As shown at block 2020, channel estimation is performed on RS used for ePDCCH, where the RS are generated using a reference signal sequence initiated with $n_{SCID}=0$. The ePDCCH is then demodulated and decoded, as seen at block 2030, using the channel estimates from previous step, to obtain $n_{SCID}$ from the ePDCCH information. As shown at block 2040, channel estimation is then performed on RS used for PDSCH, using RS taken from a reference signal sequence initiated with $n_{SCID}$. As seen at block 2050, PDSCH is then demodulated and decoded, using the resulting channel estimates.

Note that the ePDCCH and PDSCH transmissions will in general have different reference signal sequences even if both are received by a same UE in the same subframe. This would be quite different from the present setup in LTE where RS for control and data always use the same sequence initialization.

When initially accessing a stand-alone carrier, a UE needs to receive system information, which is obtained from a broadcast message. This broadcast message may be transmitted by an enhanced PBCH, which is demodulated using the RS associated with antenna port p∈{7, 8, 9, 10}. In particular, such a stand-alone carrier may not have PBCH transmissions at all if it does not include a CRS transmission (since PBCH is demodulated using CRS). Hence, determining what reference signal sequence to use on these RS that are used to demodulate and receive the system information is a problem in this scenario. The carrier may also have a channel similar to PBCH, but the same problem as with the system information applies, i.e., that it is unknown by the UE which RS sequence is used to generate the reference signals.

In this case the initialization sequence can be obtained from information contained in the synchronization sequences used to obtain synchronization on the stand alone carrier. The sequence can for example be generated in a similar manner as the examples described above. For example, in such a case the parameter $X_m$ can be derived from the synchronization signals by the UE.

The various embodiments described above can provide a number of advantages in LTE systems. In generally, these techniques provide means for improving the channel estimation performance for enhanced control channel transmission. Furthermore, these techniques may be used to provide robust channel estimation and reception of system information for new carrier types where common reference signals (CRS) are not present, in particular for initial access. Finally, several of the techniques may be used to reduce RRC signaling overhead.

Several of the techniques described above can be implemented in connection with a wireless transceiver in a radio access terminal, such as a mobile station (UE) configured to operate in wireless networks according to Release 11 specifications for LTE. A radio access terminal, which communicates wirelessly with fixed base stations in the wireless network, can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem.

Similarly, several of the techniques described above are implemented in connection with a wireless base station, such as an eNB configured according to Release 11 specifications for LTE. In general, a base station communicates with access terminals and is referred to in various contexts as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

Figure 21:
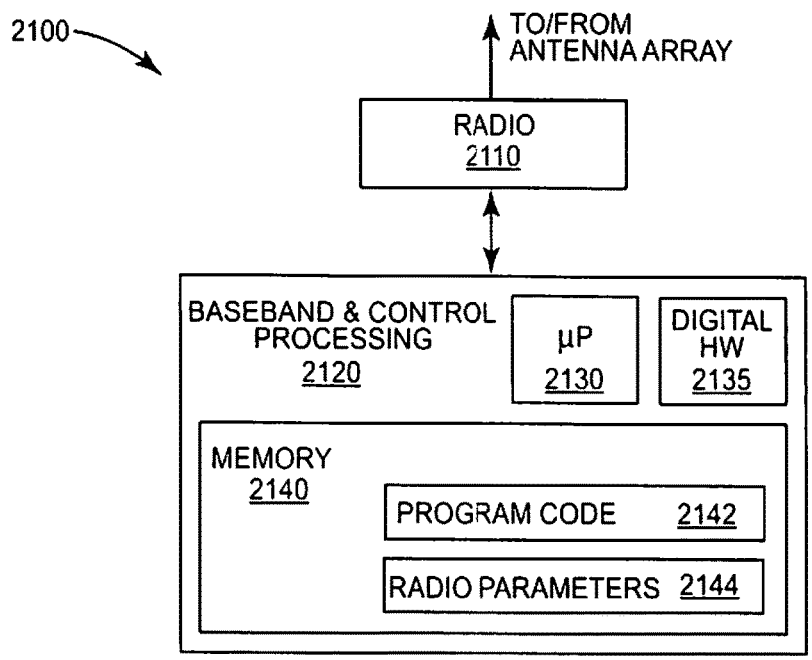
FIG. 21 illustrates components of an example wireless node according to several embodiments of the present invention.

FIG. 21 is a block diagram of a wireless transceiver apparatus 2100, illustrating a few of the components relevant to the present techniques, as realized in either a mobile station or a base station. Accordingly, the apparatus pictured in FIG. 21 can correspond to either end of a communication link, such as the link between an eNB and a UE.

The pictured apparatus includes radio circuitry 2110 and baseband & control processing circuit 2120. Radio circuitry 2110 includes receiver circuits and transmitter circuits that use known radio processing and signal processing components and techniques, typically according to a particular telecommunications standard such as the 3GPP standard for LTE and/or LTE-Advanced. Because the various details and engineering trade-offs associated with the design and implementation of such circuitry are well known and are unnecessary to a full understanding of the invention, additional details are not shown here.

Baseband & control processing circuit 2120 includes one or more microprocessors or microcontrollers 2130, as well as other digital hardware 2135, which may include digital signal processors (DSPs), special-purpose digital logic, and the like. Either or both of microprocessor(s) 2130 and digital hardware may be configured to execute program code 2142 stored in memory 2140, along with radio parameters 2144. Again, because the various details and engineering tradeoffs associated with the design of baseband processing circuitry for mobile devices and wireless base stations are well known and are unnecessary to a full understanding of the invention, additional details are not shown here The program code 2142 stored in memory circuit 2140, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 2144 include various predetermined configuration parameters as well as parameters determined from system measurements, such as channel measurements, and may include, for example, predetermined initialization values for generating reference signal sequences and/or configuration information signaled from an eNB via RRC or to be signaled to a mobile station.

Accordingly, in various embodiments of the invention, processing circuits, such as the baseband & control processing circuits 2120 of FIG. 21, are configured to carry out one or more of the techniques described above for selecting and applying reference signal sequences for use with enhanced control channels. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 22:
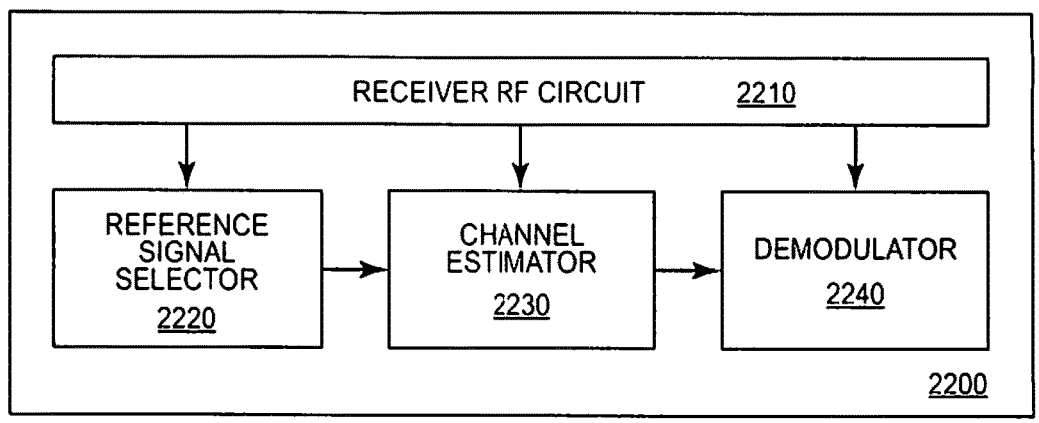
FIG. 22 illustrates functional elements of an example wireless device according to some embodiments of the present invention.

FIG. 22 provides a different view of an example wireless device 2200 according to several embodiments of the invention; this view highlighting functional elements of the wireless device 2200. Wireless device 2200, which may represent an implementation of the mobile stations/UEs described above, includes a receiver radio-frequency (RF) circuit 2220, a reference signal selector circuit 2230, and a demodulator 2240. Receiver RF circuit 2210 may consist of a portion of a radio circuit in a mobile station, such as the radio circuit 2110 pictured in FIG. 21. Likewise, all or portions of the reference signal selector 2220, channel estimator 2230, and demodulator 2240 may be implemented using one or more circuits like the baseband/control processing circuit 2120 of FIG. 21.

Wireless device 2200 is adapted to carry out one or more of the techniques described above for demodulating an enhanced control channel. For example, in several embodiments reference signal selection circuit 2220 is adapted to select from a first reference signal sequence generated from a first initialization value and a second reference signal sequence generated from a second initialization value, while channel estimator circuit is adapted to perform channel estimation for a received signal, using reference symbols taken from the selected reference signal sequence. Demodulator circuit 2240 is adapted to demodulate an enhanced control channel using the channel estimation results.

Each of the variants of the methods described earlier are applicable to wireless device 2200 as well. For instance, in some cases the reference signal selection circuit 2220 is adapted to select the first reference signal sequence in response to a determination that the enhanced control channel is targeted to a common search space and to select the second signal sequence in response to a determination that the enhanced control channel is targeted to a UE-specific search space. In still others, the reference signal selection circuit 2220 is adapted to select the first reference signal sequence in response to a determination that the enhanced control channel is a frequency-distributed transmission and to instead select the second reference signal sequence in response to a determination that the enhanced control channel is a frequency-localized transmission. Note that wireless device 2220 may be adapted to carry out one or several of these variants.

In some cases, the reference signal selection circuit 2220 is adapted to determine the first initialization value or the second initialization value, or both, based on information obtained by Radio Resource Control (RRC) signalling. In others, reference signal selection circuit 2220 is adapted to further derive the first initialization value or the second initialization value, or both, from a slot number, or a cyclic-prefix length, or both, or based on the reference signal sequence used for channel-state-information reference signal transmission or for a traffic channel transmission, or based on information obtained from a synchronization signal included in the received signal.

In any of these or in other embodiments, the reference signal selection circuit 2220 is adapted to receive configuration data identifying a set of initialization values and to obtain an index value from the demodulated enhanced control channel, the index value corresponding to a first value from the set of initialization values. The channel estimator circuit 2230 in these embodiments is adapted to perform channel estimation for a traffic channel transmission, using reference symbols taken from a reference signal sequence generated from the first value, and demodulator circuit 2240 is adapted to demodulate the traffic channel transmission using the results of said channel estimation.

Figure 23:
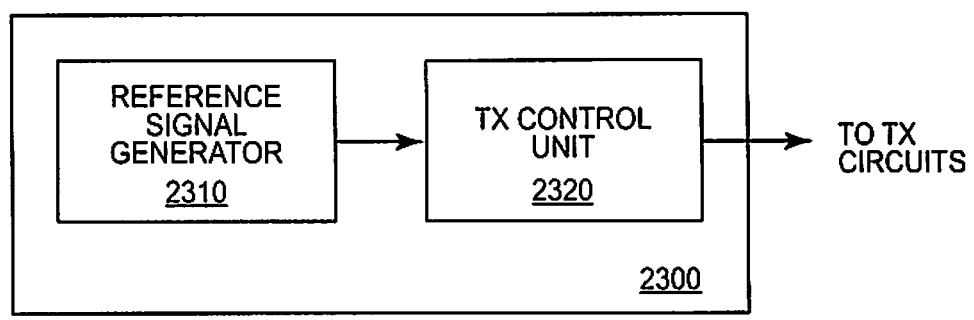
FIG. 23 illustrates functional elements of an example base station.

FIG. 23 provides a different view of an example base station 2300 according to several embodiments of the invention; this view highlighting functional elements of the base station 2300. Base station 2300 includes a reference signal generator unit 2310, and a transmitter control unit 2320. All or portions of the reference signal generator 2310 and transmit control unit 2320 may be implemented using one or more circuits like the baseband/control processing circuit 2120 of FIG. 21.

Base station 2300 is adapted to carry out one or more of the techniques described above for transmitting reference signals in association with enhanced control channels. For example, in several embodiments reference signal generation unit 2310 is adapted to generate a first reference signal sequence from a first initialization value and to generate a second reference signal sequence from a second initialization value, while transmission control unit 2320 is adapted to transmit both a first enhanced control channel and reference symbols taken from the first reference signal sequence from a first set of transmission points or using a first precoding vector, or both, and, in the same subframe or group of subframes, to transmit both a second enhanced control channel and reference symbols taken from the second reference signal sequence from a second set of transmission points or using a second precoding vector, or both.

As discussed above, in some cases the first enhanced control channel is targeted to a common search space and the second enhanced control channel is targeted to a UE-specific search space; the first enhanced control channel might be a random access response, or a paging message, or a broadcast control message, for example. In some embodiments, the transmission control unit 2320 is adapted to transmit the first enhanced control channel in a distributed fashion among two or more frequency-diverse enhanced control channel regions of the subframe or group of subframes, and to transmit the second enhanced control channel in a single frequency-localized enhanced control channel region of the subframe or group of subframes. In these or other embodiments the first reference signal sequence may be the same used for transmitting a channel-state-information reference signal. In any of these or in other embodiments, the second initialization value may be the same as or is derived from an initialization value used to obtain demodulation reference signals for a traffic channel transmission. Likewise, the reference signal generation unit 2310 in some embodiments may be adapted to derive the first initialization value from information contained in a synchronization sequence transmitted by the wireless base station.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, implemented by a wireless base station, for transmitting reference signals in a wireless network, the method comprising:
   generating a first reference signal sequence from a first initialization value; and
   generating a second reference signal sequence from a second initialization value;
   transmitting a first enhanced control channel and associated reference symbols, using reference symbols taken from one of the first and second reference signal sequences, using a first set of time-frequency resources and using a first set of transmission points or a first set of antenna ports or both; and transmitting a second enhanced control channel and associated reference symbols, using reference symbols taken from a different one of the first and second reference signal sequences, wherein said transmitting of the second enhanced control channel and associated reference symbols is in the same subframe in which the first enhanced control channel and associated reference symbols are transmitted and uses (i) a second set of transmission points, differing from the first set of transmission points, or (ii) a second set of antenna ports, differing from the first set of antenna ports, or (iii) a second set of time-frequency resources, differing from the first set of time-frequency resources, or (iv) using any combination of these second sets;

wherein said uses of reference symbols taken from the first or second reference signal sequences are each based on one or more of whether the respective enhanced control channel is targeted to a common search space or a UE-specific search space, whether the respective enhanced control channel is for receiving a random access response or a paging message or a broadcast control message, and whether the respective enhanced control channel is a frequency-localized or frequency-distributed transmission.

2. The method of claim 1, wherein the first enhanced control channel is targeted to a common search space and the second enhanced control channel is targeted to a UE-specific search space.

3. The method of claim 1, wherein the first enhanced control channel is for a random access response, or a paging message, or a broadcast control message.

4. The method of claim 1, wherein the first enhanced control channel is distributed among two or more frequency-diverse enhanced control channel regions of the subframe, and the second enhanced control channel is transmitted in a single frequency-localized enhanced control channel region of the subframe or group of subframes.

5. The method of claim 1, wherein the first reference signal sequence is the same used for transmitting a channel-state-information reference signal.

6. The method of claim 1, wherein the second initialization value is the same as or is derived from an initialization value used to obtain demodulation reference signals for a traffic channel transmission.

7. The method of claim 1, wherein the first initialization value is derived from information contained in a synchronization sequence transmitted by the wireless base station.

8. A method, implemented by a wireless device, for demodulating an enhanced control channel, the method comprising:

selecting from a first reference signal sequence generated from a first initialization value and a second reference signal sequence generated from a second initialization value, based on one or more of whether the enhanced control channel is targeted to a common search space or a UE-specific search space, whether the enhanced control channel is for receiving a random access response or a paging message or a broadcast control message, and whether the enhanced control channel is a frequency-localized or frequency-distributed transmission;

performing channel estimation for a received signal, using reference symbols taken from the selected reference signal sequence; and demodulating the enhanced control channel using the channel estimation results.

9. The method of claim 8, further comprising selecting the first reference signal sequence in response to a determination that the enhanced control channel is targeted to a common search space.

10. The method of claim 9, wherein the enhanced control channel is for receiving a random access response, or a paging message, or a broadcast control message.

11. The method of claim 8, further comprising selecting the second signal sequence in response to a determination that the enhanced control channel is targeted to a UE-specific search space.

12. The method of claim 8, further comprising selecting the first reference signal sequence in response to a determination that the enhanced control channel is a frequency-distributed transmission.

13. The method of claim 8, further comprising selecting the second reference signal sequence in response to a determination that the enhanced control channel is a frequency-localized transmission.

14. The method of claim 8, further comprising determining the first initialization value or the second initialization value, or both, based on information obtained by Radio Resource Control (RRC) signalling.

15. The method of claim 14, wherein the first initialization value or the second initialization value, or both, are further derived from a slot number, or a cyclic-prefix length, or both.

16. The method of claim 8, further comprising determining the first initialization value or the second initialization value, or both, based on the reference signal sequence used for channel-state-information reference signal transmission.

17. The method of claim 8, further comprising determining the first initialization value or the second initialization value, or both, based on the reference signal sequence used for a traffic channel transmission.

18. The method of claim 8, further comprising determining the first initialization value or the second initialization value, or both, based on information obtained from a synchronization signal included in the received signal.

19. The method of claim 8, further comprising:

receiving configuration data identifying a set of initialization values;

obtaining an index value from the demodulated enhanced control channel, the index value corresponding to a first value from the set of initialization values;

performing channel estimation for a traffic channel transmission using reference symbols taken from a reference signal sequence generated from the first value; and demodulating the traffic channel transmission using the results of said channel estimation.

20. A wireless base station, comprising:

a reference signal generation unit configured to generate a first reference signal sequence from a first initialization value and to generate a second reference signal sequence from a second initialization value;

and a transmission control unit configured to (a) transmit both a first enhanced control channel and associated reference symbols, using reference symbols taken from one of the first and second reference signal sequences, using a first set of time-frequency resources and using a first set of transmission points or a first set of antenna ports or both, and, (b) in the same subframe in which the first enhanced control channel and associated reference symbols are transmitted, to transmit both a second enhanced control channel and associated reference symbols, using reference symbols taken from a different one of the first and second reference signal sequences, using (i) a second set of transmission points, differing from the first set of transmission points, or (ii) a second set of antenna ports, differing from the first set of antenna ports, or (iii) a second set of time-frequency resources, differing from the first set of time-frequency resources, or (iv) using any combination of these second sets;

wherein said transmission control unit is configured to use reference symbols taken from the first or second reference signal sequences for each transmission of the enhanced control channels based on one or more of whether the respective enhanced control channel is targeted to a common search space or a UE-specific search space, whether the respective enhanced control channel is for receiving a random access response or a paging message or a broadcast control message, and whether the respective enhanced control channel is a frequency-localized or frequency-distributed transmission.

21. The wireless base station of claim 20, wherein the first enhanced control channel is targeted to a common search space and the second enhanced control channel is targeted to a UE-specific search space.

22. The wireless base station of claim 20, wherein the first enhanced control channel is for a random access response, or a paging message, or a broadcast control message.

23. The wireless base station of claim 20, wherein the transmission control unit is configured to transmit the first enhanced control channel in a distributed fashion among two or more frequency-diverse enhanced control channel regions of the subframe or group of subframes, and to transmit the second enhanced control channel in a single frequency-localized enhanced control channel region of the subframe or group of subframes.

24. The wireless base station of claim 20, wherein the first reference signal sequence is the same used for transmitting a channel-state-information reference signal.

25. The wireless base station of claim 20, wherein the second initialization value is the same as or is derived from an initialization value used to obtain demodulation reference signals for a traffic channel transmission.

26. The wireless base station of claim 20, wherein the reference signal generation unit is configured to derive the first initialization value from information contained in a synchronization sequence transmitted by the wireless base station.

27. A wireless device, comprising:
a reference signal selection circuit configured to select from a first reference signal sequence generated from a first initialization value and a second reference signal sequence generated from a second initialization value, based on one or more of whether an enhanced control channel to be demodulated is targeted to a common search space or a UE-specific search space, whether the enhanced control channel is for receiving a random access response or a paging message or a broadcast control message, and whether the enhanced control channel is a frequency-localized or frequency-distributed transmission;
a channel estimator circuit configured to perform channel estimation for a received signal, using reference symbols taken from the selected reference signal sequence; and
a demodulator circuit configured to demodulate the enhanced control channel using the channel estimation results.

28. The wireless device of claim 27, wherein the reference signal selection circuit is configured to select the first reference signal sequence in response to a determination that the enhanced control channel is targeted to a common search space.

29. The wireless device of claim 28, wherein the enhanced control channel is for receiving a random access response, or a paging message, or a broadcast control message.

30. The wireless device of claim 27, wherein the reference signal selection circuit is configured to select the second reference signal sequence in response to a determination that the enhanced control channel is targeted to a UE-specific search space.

31. The wireless device of claim 27, wherein the reference signal selection circuit is configured to select the first reference signal sequence in response to a determination that the enhanced control channel is a frequency-distributed transmission.

32. The wireless device of claim 27, wherein the reference signal selection circuit is configured to select the second reference signal sequence in response to a determination that the enhanced control channel is a frequency-localized transmission.

33. The wireless device of claim 27, wherein the reference signal selection circuit is configured to determine the first initialization value or the second initialization value, or both, based on information obtained by Radio Resource Control (RRC) signalling.

34. The wireless device of claim 33, wherein the reference signal selection circuit is configured to further derive the first initialization value or the second initialization value, or both, from a slot number, or a cyclic-prefix length, or both.

35. The wireless device of claim 27, wherein the reference signal selection circuit is configured to determine the first initialization value or the second initialization value, or both, based on the reference signal sequence used for channel-state-information reference signal transmission.

36. The wireless device of claim 27, wherein the reference signal selection circuit is configured to determine the first initialization value or the second initialization value, or both, based on the reference signal sequence used for a traffic channel transmission.

37. The wireless device of claim 27, wherein the reference signal selection circuit is configured to determine the first initialization value or the second initialization value, or both, based on information obtained from a synchronization signal included in the received signal.

38. The wireless device of claim 27, wherein:
said reference signal selection circuit is configured to receive configuration data identifying a set of initialization values and to obtain an index value from the demodulated enhanced control channel, the index value corresponding to a first value from the set of initialization values;
said channel estimator circuit is configured to perform channel estimation for a traffic channel transmission, using reference symbols taken from a reference signal sequence generated from the first value; and
said demodulator circuit is configured to demodulate the traffic channel transmission using the results of said channel estimation.

39. A method, implemented by a wireless device, for demodulating an enhanced control channel, the method comprising:
performing channel estimation for a received signal, using reference symbols taken from a first reference signal sequence generated from a first initialization value or taken from a second reference signal sequence generated from a second initialization value, wherein the use of the first reference signal sequence or the second reference signal sequence for said performing is based on one or more of whether the enhanced control channel is targeted to a common search space or a UE-specific search space, whether the enhanced control channel is for receiving a random access response or a paging message or a broadcast control message, and whether the enhanced control channel is a frequency-localized or frequency-distributed transmission; and demodulating the enhanced control channel using the channel estimation results.

40. The method of claim 39, further comprising selecting the first reference signal sequence, for use in said performing, in response to a determination that the enhanced control channel is targeted to a common search space.

41. The method of claim 40, wherein the enhanced control channel is for receiving a random access response, or a paging message, or a broadcast control message.

42. The method of claim 39, further comprising selecting the second signal sequence, for use in said performing, in response to a determination that the enhanced control channel is targeted to a UE-specific search space.

43. The method of claim 39, further comprising selecting the first reference signal sequence, for use in said performing, in response to a determination that the enhanced control channel is a frequency-distributed transmission.

44. The method of claim 39, further comprising selecting the second reference signal sequence, for use in said performing, in response to a determination that the enhanced control channel is a frequency-localized transmission.

45. The method of claim 39, further comprising determining the first initialization value or the second initialization value, or both, based on information obtained by Radio Resource Control (RRC) signalling.

46. The method of claim 45, wherein the first initialization value or the second initialization value, or both, are further derived from a slot number, or a cyclic-prefix length, or both.

47. The method of claim 39, further comprising determining the first initialization value or the second initialization value, or both, based on the reference signal sequence used for channel-state-information reference signal transmission.

48. The method of claim 39, further comprising determining the first initialization value or the second initialization value, or both, based on the reference signal sequence used for a traffic channel transmission.

49. The method of claim 39, further comprising determining the first initialization value or the second initialization value, or both, based on information obtained from a synchronization signal included in the received signal.

50. The method of claim 39, further comprising:
receiving configuration data identifying a set of initialization values;
obtaining an index value from the demodulated enhanced control channel, the index value corresponding to a first value from the set of initialization values;
performing channel estimation for a traffic channel transmission using reference symbols taken from a reference signal sequence generated from the first value; and
demodulating the traffic channel transmission using the results of said channel estimation.

51. A wireless device, comprising:
a channel estimator circuit configured to perform channel estimation for a received signal, using reference symbols taken from a first reference signal sequence generated from a first initialization value or taken from a second reference signal sequence generated from a second initialization value, such that the use of the first reference signal sequence or the second reference signal sequence for said performing is based on one or more of whether the enhanced control channel is targeted to a common search space or a UE-specific search space, whether the enhanced control channel is for receiving a random access response or a paging message or a broadcast control message, and whether the enhanced control channel is a frequency-localized or frequency-distributed transmission; and
a demodulator circuit configured to demodulate the enhanced control channel using the channel estimation results.

\* \* \* \* \*